(12) United States Patent
Duvall et al.

(10) Patent No.: US 12,710,104 B2
(45) Date of Patent: Aug. 18, 2026

(54) FREEZE VALVE IN A TARGET MATERIAL GENERATOR

(71) Applicant: ASML Netherlands B.V., Veldhoven (NL)

(72) Inventors: Wyatt Duvall, San Diego, CA (US); Ethan Marcus Swerdlow, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 86 days.

(21) Appl. No.: 18/866,306

(22) PCT Filed: Mar. 20, 2023

(86) PCT No.: PCT/EP2023/057030
§ 371 (c)(1),
(2) Date: Nov. 15, 2024

(87) PCT Pub. No.: WO2023/222281
PCT Pub. Date: Nov. 23, 2023

(65) Prior Publication Data

US 2025/0320930 A1 Oct. 16, 2025

Related U.S. Application Data

(60) Provisional application No. 63/343,638, filed on May 19, 2022.

(51) Int. Cl.
*F16K 13/10* (2006.01)
*F16K 13/00* (2006.01)
(Continued)

(52) U.S. Cl.
CPC .............. *F16K 13/10* (2013.01); *F16K 13/00* (2013.01); *F16K 31/002* (2013.01); *H05G 2/0023* (2024.08); *H05G 2/0027* (2024.08)

(58) Field of Classification Search
CPC ........ F16K 13/10; F16K 13/00; F16K 17/383; F16K 31/002; F16K 31/025; H05G 2/0027; H05G 2/0023; H05G 2/002; H05G 2/001
See application file for complete search history.

(56) References Cited

U.S. PATENT DOCUMENTS 2,919,710 A * 1/1960 Lantz ........................ G21D 1/02 137/340
4,612,959 A * 9/1986 Costello .................. F16K 13/10 137/251.1
(Continued)

FOREIGN PATENT DOCUMENTS

CA 1017923 A 9/1977
CN 102182454 A 9/2011
(Continued)

OTHER PUBLICATIONS

Tiberga Marco et al: "Preliminary investigation on the melting behavior of a freeze-valve for the Molten Salt Fast Reactor", Annals of Nuclear Energy, Pergamon Press, Oxford, GB, vol. 132, Jun. 29, 2019, pp. 544-554.
(Continued)

*Primary Examiner* — David Colon-Morales
(74) *Attorney, Agent, or Firm* — DiBerardino McGovern IP Group LLC

(57) ABSTRACT

A freeze valve includes: a valve sleeve defining an axial bore that is in fluid communication with a first fluid port; and a valve body defining an axial opening between an axially-closed end that is received within the axial bore and an axially-open end that is in fluid communication with a second fluid port. The valve body includes one or more through holes formed in a longitudinal section of the valve body at the axially-closed end, each through hole fluidly
(Continued)

coupling the axial opening and the axial bore of the valve sleeve.

20 Claims, 15 Drawing Sheets

(51) Int. Cl.
*F16K 31/00* (2006.01)
*H05G 2/00* (2006.01)

(56) References Cited

U.S. PATENT DOCUMENTS

| | | | | |
|---|---|---|---|---|
| 4,949,742 | A * | 8/1990 | Rando | F16K 31/002 137/13 |
| 4,989,626 | A * | 2/1991 | Takagi | F16L 55/103 137/341 |
| 5,267,584 | A * | 12/1993 | Smith | G05D 7/0629 137/13 |
| 5,311,896 | A * | 5/1994 | Kaartinen | C23C 14/0005 137/15.01 |
| 5,362,027 | A * | 11/1994 | Champaigne | F16K 31/082 137/251.1 |
| 5,988,197 | A * | 11/1999 | Colin | F16L 55/103 137/251.1 |
| 6,044,866 | A * | 4/2000 | Rohrbeck | F16K 13/10 137/251.1 |
| 6,102,897 | A * | 8/2000 | Lang | F16K 13/00 604/246 |
| 6,311,713 | B1 * | 11/2001 | Kaartinen | F16K 13/10 137/13 |
| 6,507,641 | B1 * | 1/2003 | Kondo | G03F 7/70033 378/119 |
| 6,536,476 | B2 * | 3/2003 | Ueno | F15C 5/00 137/833 |
| 6,557,575 | B1 * | 5/2003 | Gerhardt | B01L 3/502738 137/251.1 |
| 6,578,596 | B1 * | 6/2003 | Batchelder | B29C 48/345 137/13 |
| 6,679,279 | B1 * | 1/2004 | Liu | B01L 3/502738 137/806 |
| 6,799,595 | B1 * | 10/2004 | Salan | F16K 13/10 137/341 |
| 6,883,326 | B2 * | 4/2005 | Winkler | F16K 31/002 251/11 |
| 6,955,589 | B2 * | 10/2005 | Kordonski | B24B 1/005 451/36 |
| 6,973,938 | B2 * | 12/2005 | Mitchell | F16K 13/10 137/247.35 |
| 7,122,816 | B2 * | 10/2006 | Algots | H05G 2/007 250/493.1 |
| 7,128,081 | B2 * | 10/2006 | Dourdeville | F16K 13/10 137/341 |
| 7,156,117 | B2 * | 1/2007 | Bohm | G05D 7/0694 137/806 |
| 7,159,618 | B2 * | 1/2007 | Broyer | F16K 99/0001 137/833 |
| 7,195,036 | B2 * | 3/2007 | Burns | F16K 99/0017 137/251.1 |
| 7,204,263 | B2 * | 4/2007 | Tsukita | B01F 33/055 204/601 |
| 7,478,792 | B2 * | 1/2009 | Oh | F16K 99/0046 137/251.1 |
| 7,694,694 | B2 * | 4/2010 | Welle | B01L 3/502738 137/831 |
| 7,841,190 | B2 * | 11/2010 | Gerhardt | F16K 31/002 137/340 |
| 7,998,433 | B2 * | 8/2011 | Park | F16K 99/0001 422/50 |
| 8,642,353 | B2 * | 2/2014 | Welle | B01D 9/04 422/260 |
| 8,901,523 | B1 * | 12/2014 | Ershov | H01J 37/32477 250/493.1 |
| 8,973,613 | B2 * | 3/2015 | Murphy | F16K 31/02 204/600 |
| 8,985,288 | B2 * | 3/2015 | Battlogg | F16K 31/0675 188/267.2 |
| 9,512,935 | B2 * | 12/2016 | Vergne | F16K 99/0036 |
| 9,544,982 | B2 * | 1/2017 | Zhao | B01D 15/08 |
| 9,544,983 | B2 * | 1/2017 | Rajyaguru | H05G 2/002 |
| 9,699,876 | B2 * | 7/2017 | Vaschenko | H05G 2/0025 |
| 9,726,302 | B2 * | 8/2017 | Bassler | B01L 3/502769 |
| 9,995,411 | B1 * | 6/2018 | Moorman | F16K 99/0036 |
| 11,442,365 | B1 * | 9/2022 | Sun | G03F 7/70975 |
| 12,063,734 | B2 * | 8/2024 | Sun | G03F 7/70975 |
| 2003/0094206 | A1 | 5/2003 | Gerhardt et al. | |
| 2005/0199129 | A1 | 9/2005 | Glucksman et al. | |
| 2014/0217313 | A1 * | 8/2014 | Killinger | F16K 31/002 251/11 |

FOREIGN PATENT DOCUMENTS

| | | | | | |
|---|---|---|---|---|---|
| CN | 105546164 | A | * | 5/2016 | F16K 49/00 |
| DE | 2442915 | A1 | | 3/1975 | |
| GB | 838087 | A | | 6/1960 | |
| JP | 2017115910 | A | * | 6/2017 | |
| WO | WO-2020086902 | A1 | * | 4/2020 | G03F 7/70033 |
| WO | WO-2020187617 | A1 | * | 9/2020 | H05G 2/0027 |

OTHER PUBLICATIONS

Connection Assembly, Research Disclosure Database No. 685012, Mar. 29, 2021, 14 total pages.

Chiara Giovanardi, European International Searching Authority, International Search Report and Written Opinion, counterpart PCT Application No. PCT/EP2023/057030, mailed Jul. 27, 2023, 20 total pages.

Freeze Valve in a Target Material Generator, Disclosed anonymously, Questel Research Disclosure, Research Disclosure Database No. 704068, Nov. 21, 2022, 32 total pages.

* cited by examiner 346
342
311
300
325
305
320
321
301B
348
301A
310
344
347
345
340

601A
600
607S
608G
607L
630
605
610
625-i
621
620
601B
Y
X
Z

FREEZE VALVE IN A TARGET MATERIAL GENERATOR

CROSS REFERENCE TO RELATED APPLICATIONS

This application claims priority to U.S. Application No. 63/343,638, filed May 19, 2022, titled FREEZE VALVE IN A TARGET MATERIAL GENERATOR, which is incorporated herein in its entirety by reference.

TECHNICAL FIELD

The disclosed subject matter relates to a freeze valve for a target material generator.

BACKGROUND

Extreme ultraviolet (EUV) light, for example, electromagnetic radiation having wavelengths of 100 nanometers (nm) or less (also sometimes referred to as soft x-rays), and including light at a wavelength of, for example, 20 nm or less, between 5 and 20 nm, or between 13 and 14 nm, can be used in photolithography processes to produce extremely small features in or on substrates, for example, silicon wafers, by initiating polymerization in a resist layer. Methods for generating EUV light include, but are not limited to, altering the physical state of a source material to a plasma state. The source material includes a compound or an element, for example, xenon, lithium, or tin, with an emission line in the EUV range. In one such method, often termed laser produced plasma ("LPP"), the required plasma is produced by irradiating a source material, for example, in the form of a droplet, stream, or cluster of source material, with an amplified light beam that can be referred to as a drive laser. For this process, the plasma is typically produced in a sealed vessel, for example, a vacuum chamber, and monitored using various types of metrology equipment. The source material, such as xenon, lithium, or tin, which emit in the EUV range when in the plasma state, are commonly referred to as target material since they are targeted and irradiated by the drive laser. The droplet, stream, or cluster of target material is produced by a target material generator within which the target material is transported.

SUMMARY

In some general aspects, a freeze valve includes a valve body including a longitudinal section defining an axial opening through which fluid flows. The valve body defines a plurality of holes, each hole extending from and in fluid communication with the axial opening and through the longitudinal section of the valve body, each hole having a diameter that is smaller than a diameter of the axial opening.

Implementations can include one or more of the following features. For example, the longitudinal section of the valve body can have a cylindrical shape. Each hole can extend radially between the axial opening and an exterior of the valve body. The valve body can include an axial stop at an end of the longitudinal section, the axial stop being configured to retain solid target material at temperatures below the freezing point of the target material, for example, upon application of a pressure along the axial opening. The holes can provide a flow path that enables a gas to flow between the axial opening of the valve body and a first fluid port of the freeze valve at temperatures above the freezing point of the target material. The axial stop can be configured to retain the solid target material at temperatures below the freezing point of the target material and at pressures greater than 30,000 pounds per square inch (PSI). The holes can be configured to enable the gas to flow between the axial opening and the first fluid port at a conductance of at least $10^{-5}$ liters/second (L/s) at room temperature and in the molecular flow regime. The target material can include tin and the gas can include an inert gas and hydrogen.

The valve body can be made of a refractory metal. The valve body can be made of molybdenum, tungsten, niobium, rhenium, or an alloy of any of these materials.

The freeze valve can further include a valve sleeve axially aligned with the valve body, the valve body being received within an axial bore of the valve sleeve. A fluid flow gap can be defined between the valve sleeve and the valve body such that a fluid flow path is formed between the holes of the valve body and the axial bore of the valve sleeve.

Each of the holes can extend perpendicularly to the axial direction of the axial opening.

In other general aspects, a freeze valve includes: a valve sleeve defining an axial bore that is in fluid communication with a first fluid port; and a valve body including a longitudinal section. The valve body defines an axial opening between an axially-closed end that is received within the axial bore and an axially-open end that is in fluid communication with a second fluid port. The valve body includes one or more through holes formed in the longitudinal section at the axially-closed end, each through hole fluidly coupling the axial opening and the axial bore of the valve sleeve.

Implementations can include one or more of the following features. For example, each of the one or more through holes can have a diameter that is smaller than a diameter of the axial opening. The longitudinal section of the valve body can have a cylindrical shape. The axially-closed end can include an axial stop at an end of the longitudinal section, the axial stop being configured to retain solid target material at temperatures below the freezing point of the target material, for example, upon application of a pressure along the axial opening. The holes can provide a flow path for gas to flow between the axial opening of the valve body and the first fluid port at temperatures above the freezing point of the target material. The axial stop can be configured to retain the solid target material at temperatures below the freezing point of the target material and at pressures greater than 30,000 pounds per square inch (PSI). The holes can provide the flow path for gas to flow through the holes at a conductance of at least $10^{-5}$ liters/second (L/s) at room temperature and in the molecular flow regime. The target material can include tin and the gas can include an inert gas and hydrogen.

The valve body and the valve sleeve can be made of a refractory metal. The valve body and the valve sleeve can be made of molybdenum, tungsten, niobium, rhenium, or an alloy of any of these materials. The valve sleeve and the valve body can be axially aligned. A fluid flow gap can be defined between the valve sleeve and the valve body such that a fluid flow path is formed between the holes of the valve body and the axial bore of the valve sleeve. Each of the holes can extend perpendicularly to the axial direction of the axial opening. The first fluid port and the second fluid port can be axially aligned with the valve body. Each hole can extend radially from the axial opening to the axial bore at an exterior of the longitudinal section of the valve body.

In other general aspects, a method of controlling fluid includes: cooling a target material within an axial opening of a valve body; once the target material is frozen, preventing the frozen target material from axially extruding from the valve body when an axial pressure greater than 10,000 PSI is applied to the frozen target material including stopping the frozen target material at an axial stop formed at an axially-closed end of the valve body; thawing the target material within the axial opening of the valve body; and once the target material is thawed, enabling a fluid to flow between the axial opening of the valve body and a first fluid port through the through holes formed in a longitudinal section of the valve body at the axially-closed end.

Implementations can include one or more of the following features. For example, the fluid can be enabled to flow between the axial opening of the valve body and the first fluid port through the through holes formed in the longitudinal section by supplying pressurized gas through the first fluid port and into the axial opening by way of the through holes. The pressurized gas can push thawed target material out of the axial opening of the valve body.

The frozen target material can be prevented from axially flowing out of the valve body by preventing the frozen target material from axially extruding from the valve body when the axial pressure greater than 30,000 PSI is applied to the frozen target material including stopping the frozen target material at the axial stop. The fluid can be enabled to flow between the axial opening of the valve body and the first fluid port through the through holes by enabling fluid to flow at a conductance that is greater than at least $10^{-5}$ liters/second (L/s) at room temperature and in the molecular flow regime.

In other general aspects, a target material nozzle assembly includes: a nozzle in fluid communication with a reservoir; and a purging freeze valve in fluid communication with a fluid flow path between the nozzle and the reservoir. The purging freeze valve includes: a valve sleeve defining an axial bore that is in fluid communication with a first fluid port; and a valve body defining an axial opening between an axially-closed end that is received within the axial bore and an axially-open end that is in fluid communication with a second fluid port that is in fluid communication with the fluid flow path between the nozzle and the reservoir. The valve body includes one or more through holes formed in a longitudinal section of the valve body at the axially-closed end, each through hole fluidly coupling the axial opening and the first fluid port.

DESCRIPTION

Figure 1A:
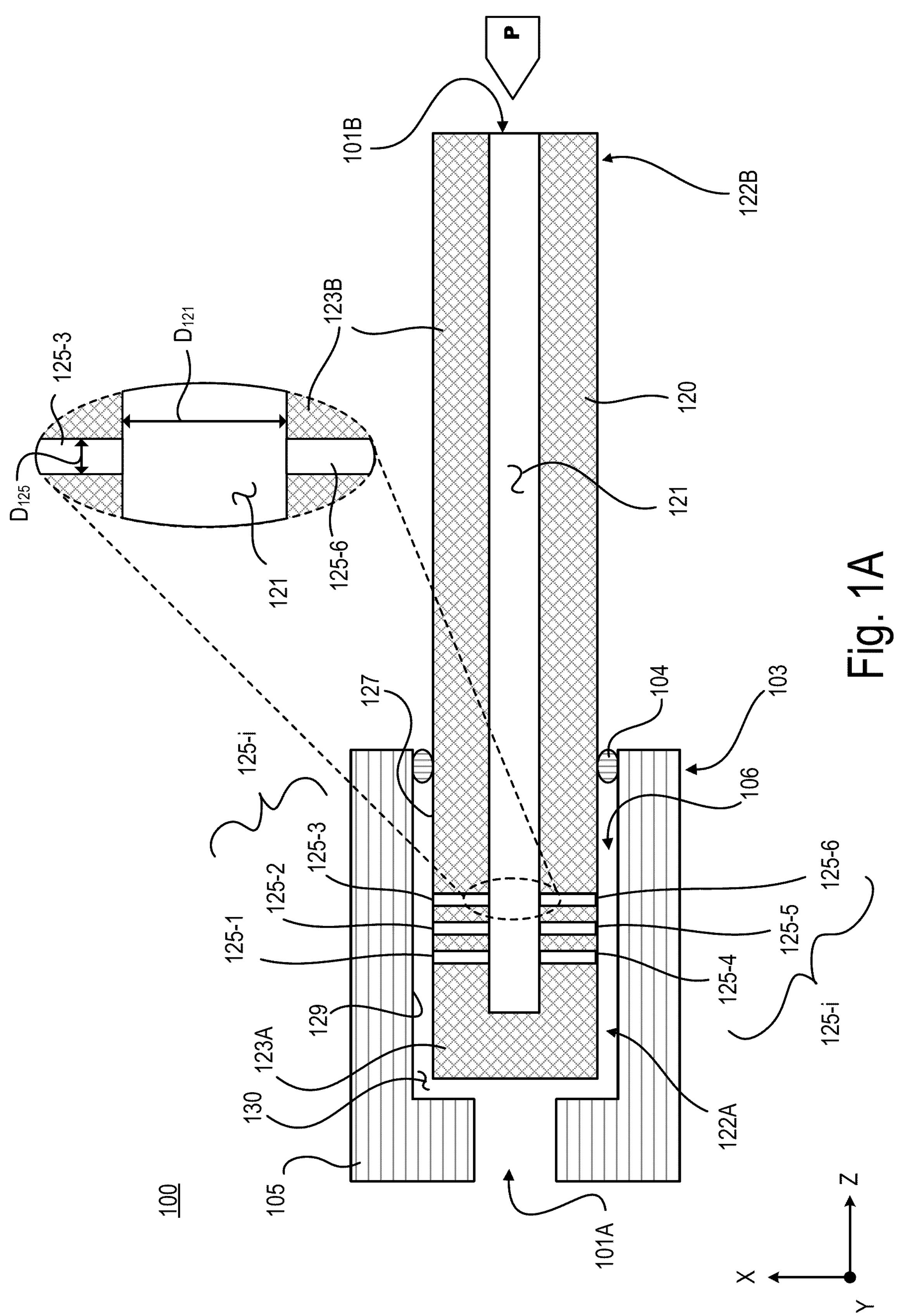
FIG. 1A is a block diagram of a freeze valve including a valve body having an axially-closed end received in a valve sleeve.
Figures 1B, 1C:
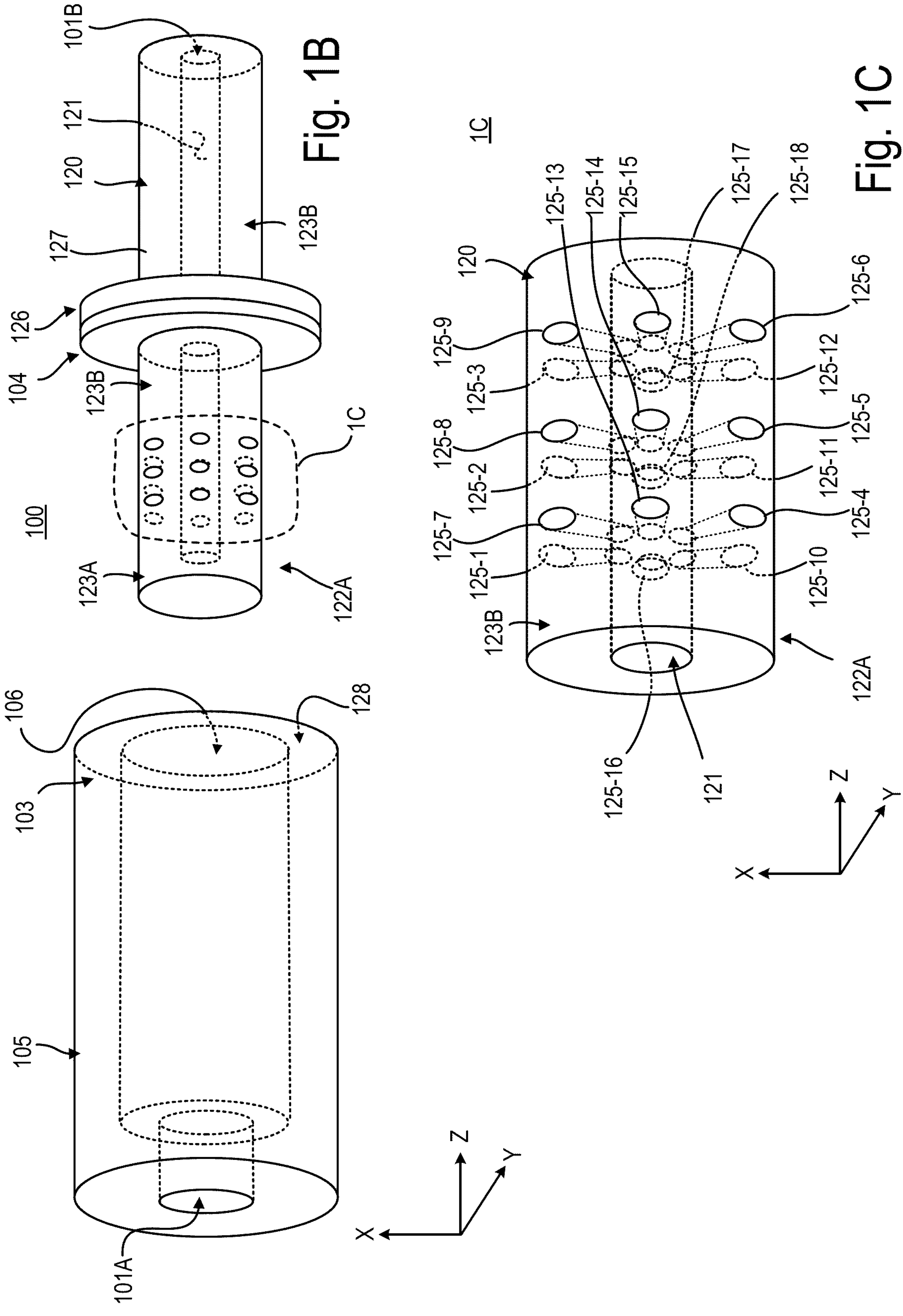
FIG. 1B is an exploded perspective view of the freeze valve of FIG. 1A.
FIG. 1C is a close-up perspective view of the axially-closed end of the valve body of FIG. 1B, showing details of through holes.

Referring to FIGS. 1A and 1B, a freeze valve 100 includes a valve sleeve 105 and a valve body 120. The valve sleeve 105 defines an axial bore 106 that is in fluid communication with a first fluid port 101A. The valve body 120 defines an axial opening 121 between an axially-closed end 122A that is received within the axial bore 106 and an axially-open end 122B that is in fluid communication with a second fluid port 101B. The valve body 120 includes an axial stop 123A at the axially-closed end 122A and a longitudinal section 123B extending axially along the +Z direction from the axial stop 123A, the axial opening 121 within the longitudinal section 123B. A gap 130 is formed between the valve sleeve 105 and the axially-closed end 122A. The axial opening 121 extends along an axial direction that is parallel with the Z axis. The valve body 120 includes one or more through holes 125-*i* formed in the axially-closed end 122A and extending through the longitudinal section 123B, where i is the set of numbers 1, 2, . . . , I and I is a positive integer. Each through hole 125-*i* extends along a hole axis that is in a plane that is nonparallel with the Z axis. For example, each through hole 125-*i* can have a hole axis that is in the XY plane, which is perpendicular to the Z axis and in the illustrated embodiments of FIGS. 1A and 1B, the through holes 125-*i* are also radially-extending. In other embodiments, the through holes may have a hole axis that is in the XY plane and perpendicular to the Z axis but may extend along a direction that is angled with respect to the radial direction. The through holes 125-*i* function, at certain moments during operation, as fluid flow conduits.

In FIG. 1A, six through holes 125-1, 125-2, 125-3, 125-4, 125-5, 125-6 are shown. However, fewer than six or greater than six through holes can be formed in the valve body 120. For example, in FIGS. 1B and 1C, there are 18 through holes, namely, 125-1, 125-2, 125-3, 125-4, 125-5, 125-6, 125-7, 125-8, 125-9, 125-10, 125-11, 125-12, 125-13, 125-14, 125-15, 125-16, 125-17, 125-18, which are shown more clearly and are labeled in the close-up view of FIG. 1C. Each through hole 125-*i* provides a flow path for fluid between the axial opening 121 and the gap 130 formed between the valve sleeve 105 and the valve body 120. Moreover, because the valve body 120 is sealed to the open end 103 of the valve sleeve 105 using a sealing element 104 (such as an annular gasket), any fluid that flows within the axial bore 106 is in fluid communication with the first fluid port 101A since fluid is prevented from crossing the sealing element 104. In some implementations, as shown in FIG. 1A, the annular gasket 104 can be seated between an outer cylindrical surface 127 of the longitudinal section 123B of the valve body 120 and an inner cylindrical surface 129 of the valve sleeve 105. In other implementations, as shown in FIG. 1B, the annular gasket 104 can be seated between a radial flange 126 (formed on an outer cylindrical surface 127 of the longitudinal section 123B of the valve body 120) and an outer radial surface 128 of the valve sleeve 105.

The freeze valve 100 is configured to perform two functions. A first function occurs when the valve 100 is in a closed state, in which the freeze valve 100 holds or maintains target material. The freeze valve 100 is able to perform the first function after it has been cooled substantially enough such that the target material within the freeze valve 100 freezes and becomes a solid target material. This solid target material acts as a plug that prevents fluids to flow through the freeze valve 100. A second function occurs when the freeze valve 100 is in an open state, in which the freeze valve 100 permits a fluid to flow, such fluid could be a gas, a liquid, or a combination of a gas and a liquid. The freeze valve 100 is able to perform the second function after it has been warmed substantially enough such that the target material within the freeze valve 100 thaws and becomes a fluid (such as a liquid) target material.

Figure 2A:
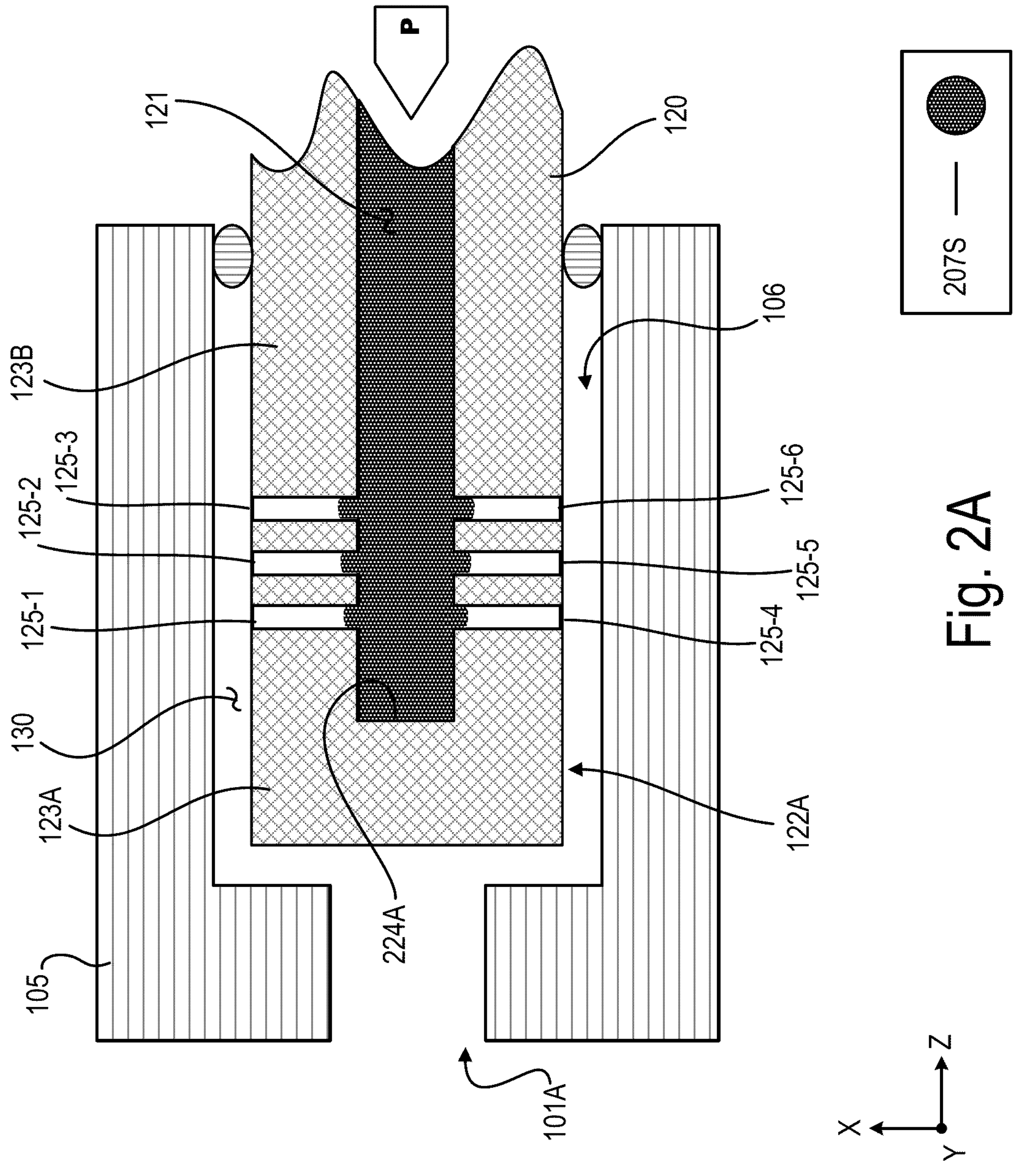
FIG. 2A is a block diagram showing the valve sleeve and the axially-closed end of the valve body of the freeze valve of FIG. 1 when the freeze valve is in a closed state.

Referring to FIG. 2A, while the freeze valve 100 is closed, and therefore during performance of the first function, in which the target material within the freeze valve 100 is a solid target material 207S, the freeze valve 100 needs to be able to hold the solid target material 207S within the axial opening 121 under anticipated operating pressures P applied along the −Z direction. Typically, pressures P that can be applied along the −Z direction can reach up to a maximum value P max of 8000 pounds per square inch (PSI) before the solid target material begins to extrude along the −Z direction out of the freeze valve. On the other hand, the freeze valve 100 is designed such that, when closed (and during the performance of the first function), the solid target material 207S within the axial opening 121 does not extrude along the −Z direction out of the freeze valve 100 even at pressures that reach up to a maximum value P max of 31,000 PSI. Instead, the only path through which solid target material 207S could extrude is through the holes 125-*i*, and therefore the solid target material can only extrude out of the axial opening 121 along a direction that is not parallel with the −Z direction. Thus, if the holes 125-*i* are arranged to be radially-extending, then the vector for extrusion of solid target material 207S out of the axial opening 121 is along the XY plane, which is orthogonal to the vector of the pressure P applied to the solid target material 207S, which is along the −Z direction. The pressure at which the solid target material 207S within the axial opening 121 extrudes out of the freeze valve 100 is referred to as the "punch pressure." Because the extrusion vector is orthogonal to the pressure P vector (in this example), the punch pressure of the freeze valve 100 is much larger than prior freeze valves, and can be at least 10,000 PSI, at least 20,000 PSI, at least 30,000 PSI, or at least 31,000 PSI.

Figure 2B:
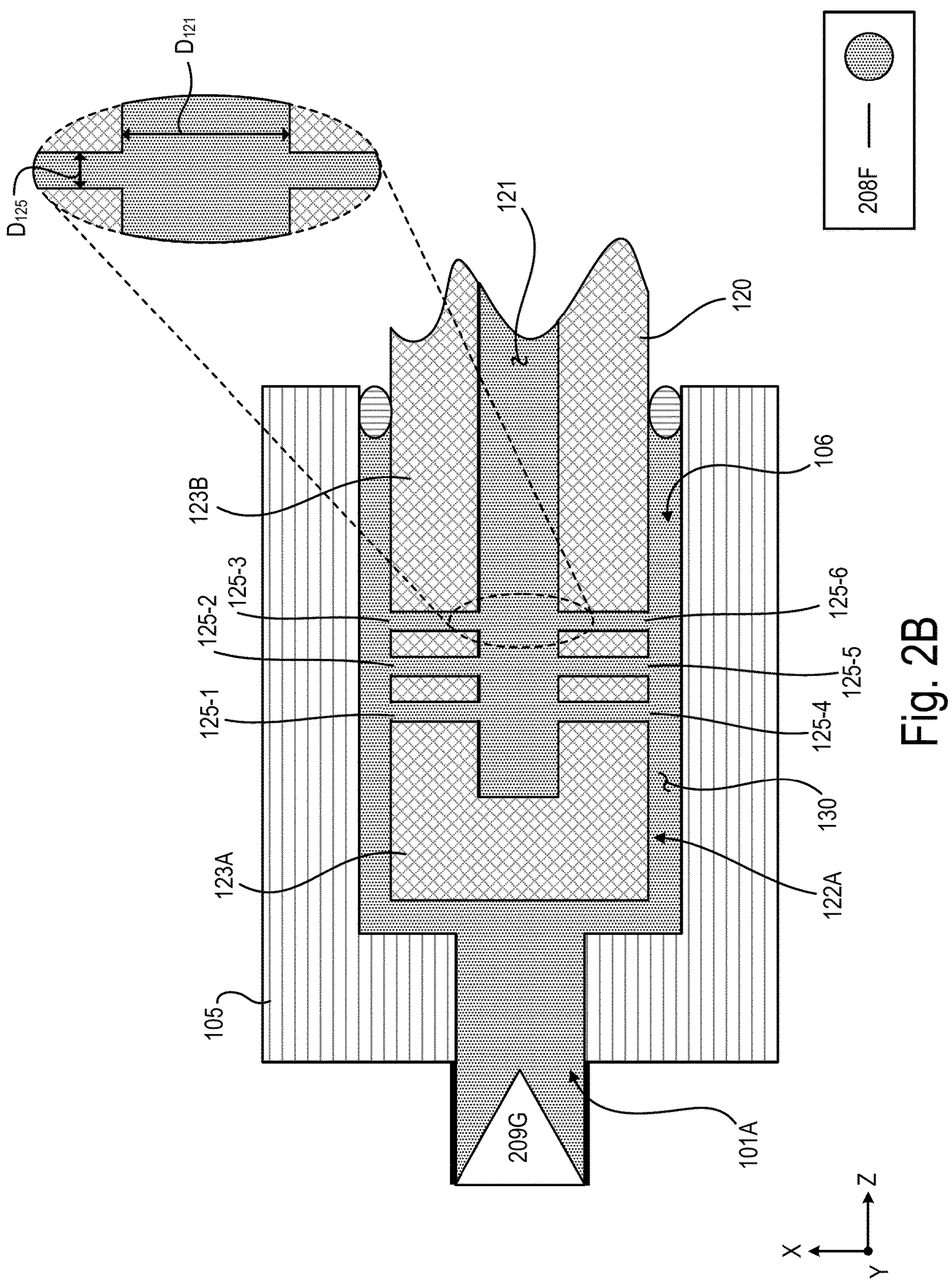
FIG. 2B is a block diagram showing the valve sleeve and the axially-closed end of the valve body of the freeze valve of FIG. 1 when the freeze valve is in an open state.

Referring to FIG. 2B, on the other hand, while the freeze valve 100 is open, and therefore during performance of the second function, in which any target material within the freeze valve 100 is liquid, the freeze valve 100 needs to be able to conduct a fluid 208F through the axial opening 121 at an acceptable rate. The rate at which the fluid 208F is conducted through the axial opening 121 is referred to as the "conductance" of the freeze valve 100. The fluid 208F can include the target material in fluid or liquid form (the fluid target material). The fluid 208F can also include a fluid material other than the target material such as a purging gas. The freeze valve 100 is designed such that, even though the punch pressure of the freeze valve 100 can be at 31,000 PSI (during performance of the first function), the conductance of any fluid 203F through the freeze valve 100 (during performance of the second function) is not adversely impacted by the design of the freeze valve 100 that enables the punch pressure increase during performance of the first function. The conductance of the fluid 208F through the freeze valve 100 (and specifically through the axial opening 121) can be increased by increasing the number of through holes 125-*i* because the conductance scales linearly with the number of holes 125-*i*. Indeed, the freeze valve 100 can be designed such that the conductance of the fluid 208F through the freeze valve 100 during performance of the second function is improved (for example, by a factor of 10, 20, or even 30) when compared with prior freeze valves that lacked the through holes 125-*i*.

The improvements to the punch pressure as well as the maintenance (and improvement) of the conductance of the freeze valve 100 are the result of axially-closing one end of the valve body 120 (the axially-closed end 122A) and including the through holes 125-*i* in the longitudinal section 123B near or at the axially-closed end 122A, as discussed in more detail next.

Referring again to FIG. 2A, under pressure P, solid target material 207S within the axial opening 121 pushes against an inner wall 224A of the axial stop 123A and also enters the through holes 125-*i* within the longitudinal section 123B. However, the solid target material 207S is unable to fully pass through the through holes 125-*i*. The reason for this is due to the geometric configuration and number of the through holes 125-*i*. In particular, the through holes 125-*i* extend axially along a direction that is nonparallel with the axial direction (which is parallel with the Z axis) of the axial opening 121. A nonparallel direction can be a direction that is, for example, perpendicular with (at a 90° angle from) the Z axis or it can be at an angle that is between 0-90° from the Z axis. Moreover, as shown in the detail of FIG. 1A, each of the holes 125-*i* has a diameter $D_{125}$ (taken along a direction perpendicular to the axial direction of each hole 125-*i*) that is a fraction of the diameter $D_{121}$ (taken along a direction perpendicular to the Z axis) of the axial opening 121. On the other hand, the pressure P applied to the solid target material 207S is applied along the axial direction (the −Z direction). The solid target material 207S that is pushed along the −Z direction faces greater friction in the freeze valve 100 because of these geometric constraints. Thus, a greater amount of force is applied to the solid target material 207S along the +Z direction in response to the pressure P being applied along the −Z direction. Accordingly, the punch pressure that would force the solid target material 207S to flow all the way through the holes 125-*i*, into the axial bore 106 (in the gap between the valve body 120 and the valve sleeve 105), and through the first fluid port 101A is much greater than (for example, twice as large, three times as large, or even four times as large as) the punch pressure that would simply force a solid target material 207S through an opening of an axially-open end of the valve body 120 in a prior freeze valve. Accordingly, the solid target material 207S remains within the axial opening 121 (or a small amount is extruded into one or more of the holes 125-*i* for recapture during the performance of the second function).

Figure 3:
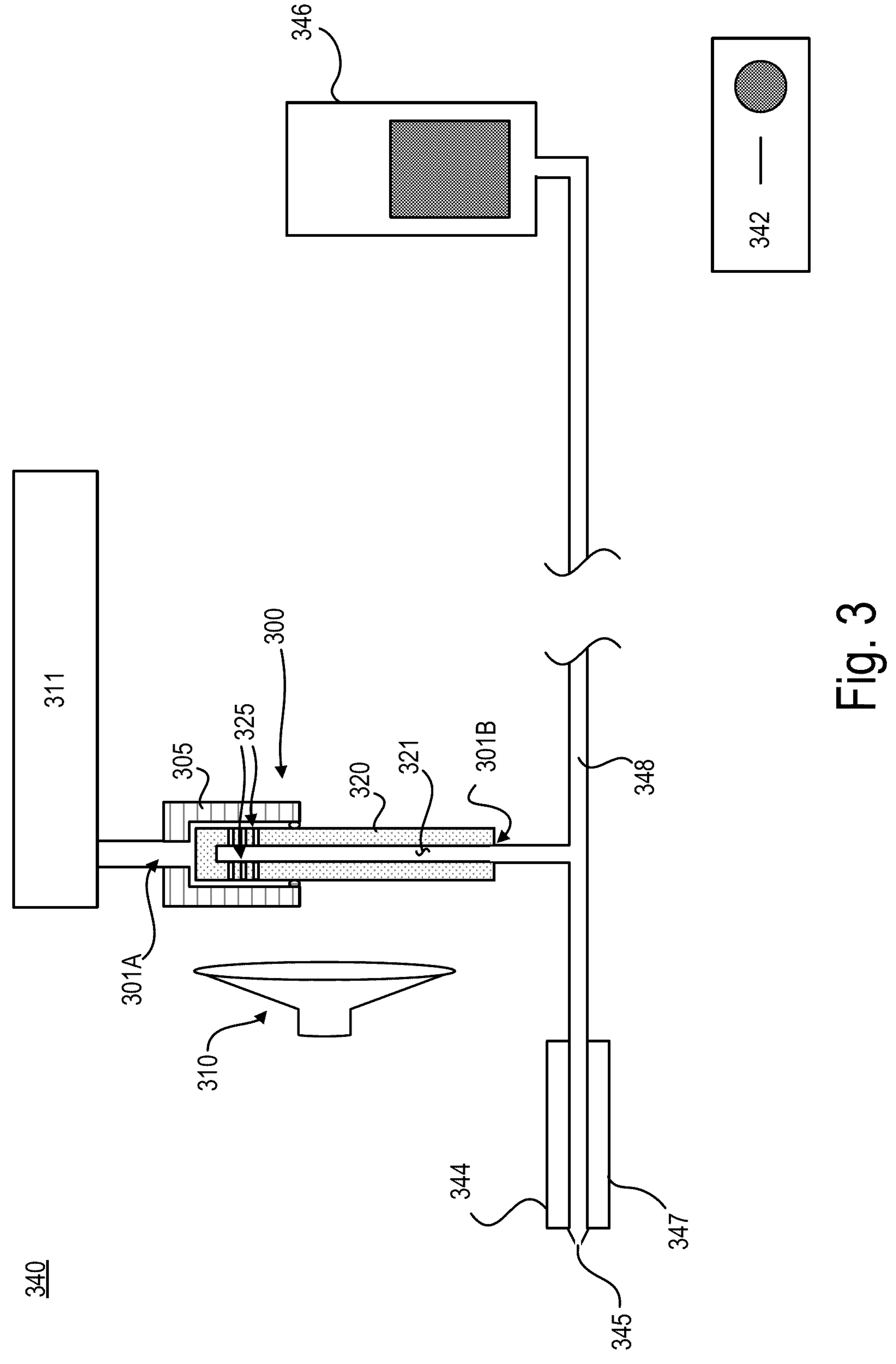
FIG. 3 is a schematic diagram showing the freeze valve of FIGS. 1A-1C in a target material nozzle assembly.
Figure 4A:
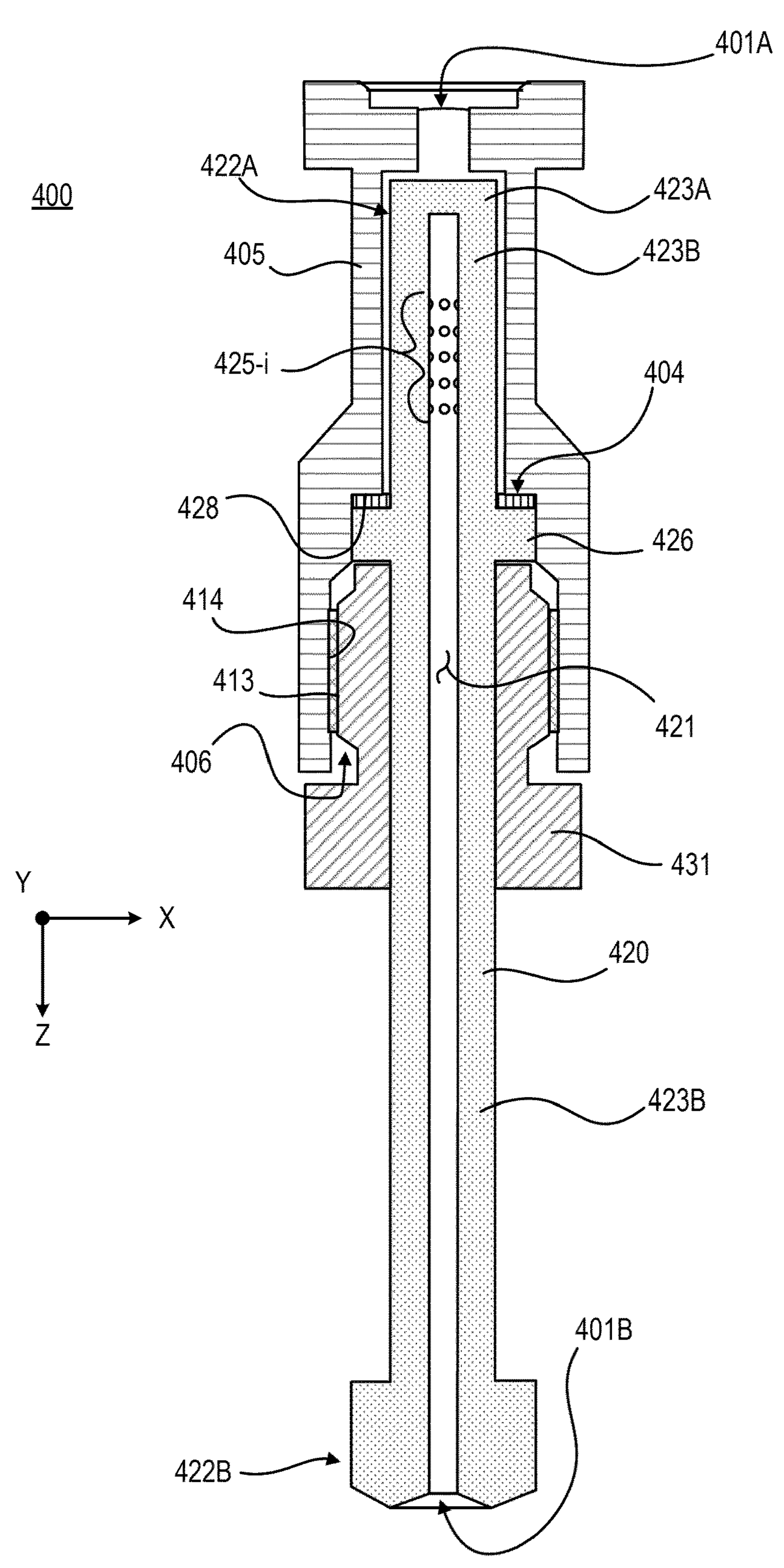
FIG. 4A is a side cross-sectional view of an implementation of the freeze valve of FIGS. 1A-1C.
Figure 4B:
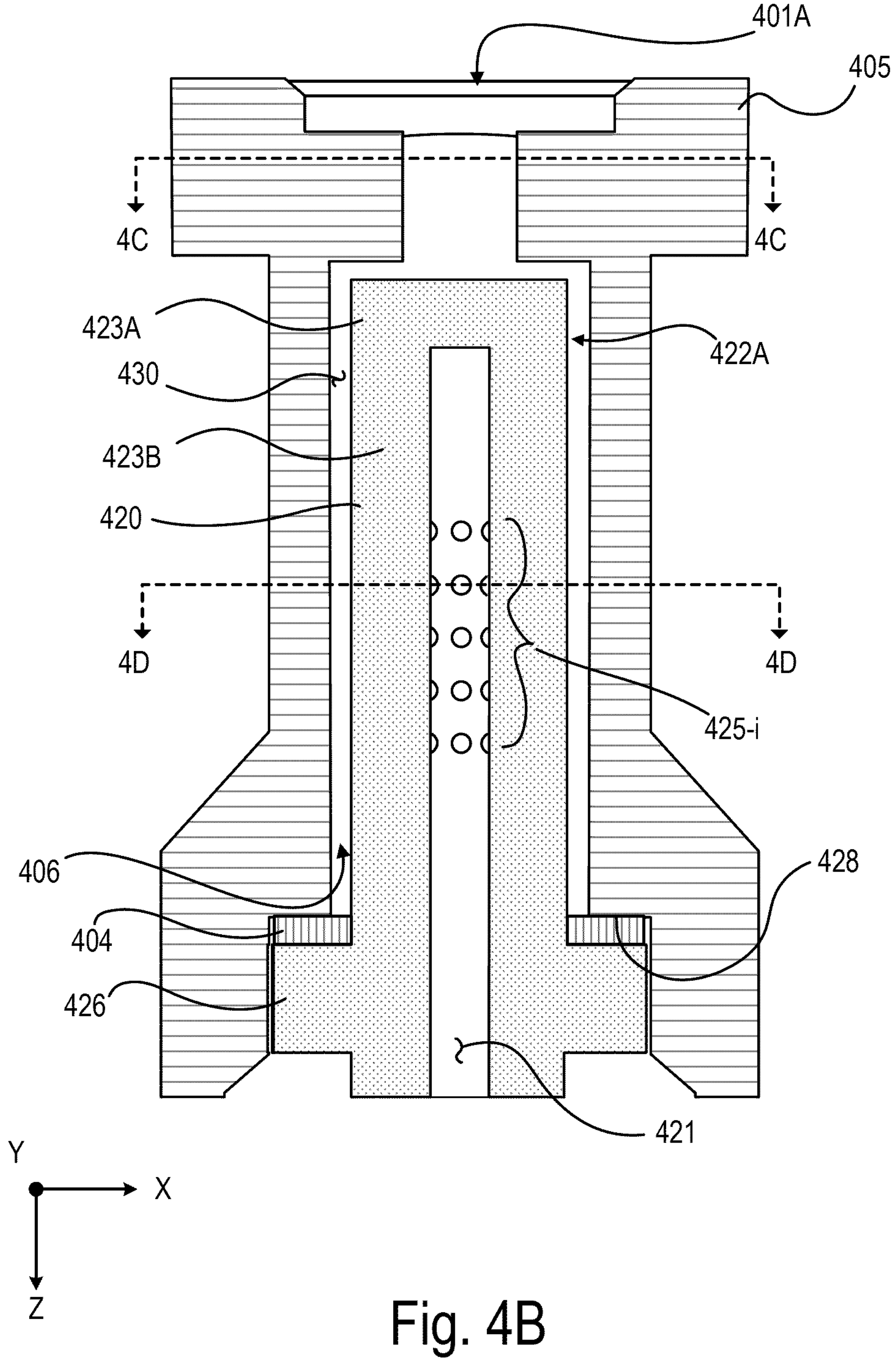
FIG. 4B is a close-up of an axially-closed end of the freeze valve of FIG. 4A.
Figure 4C:
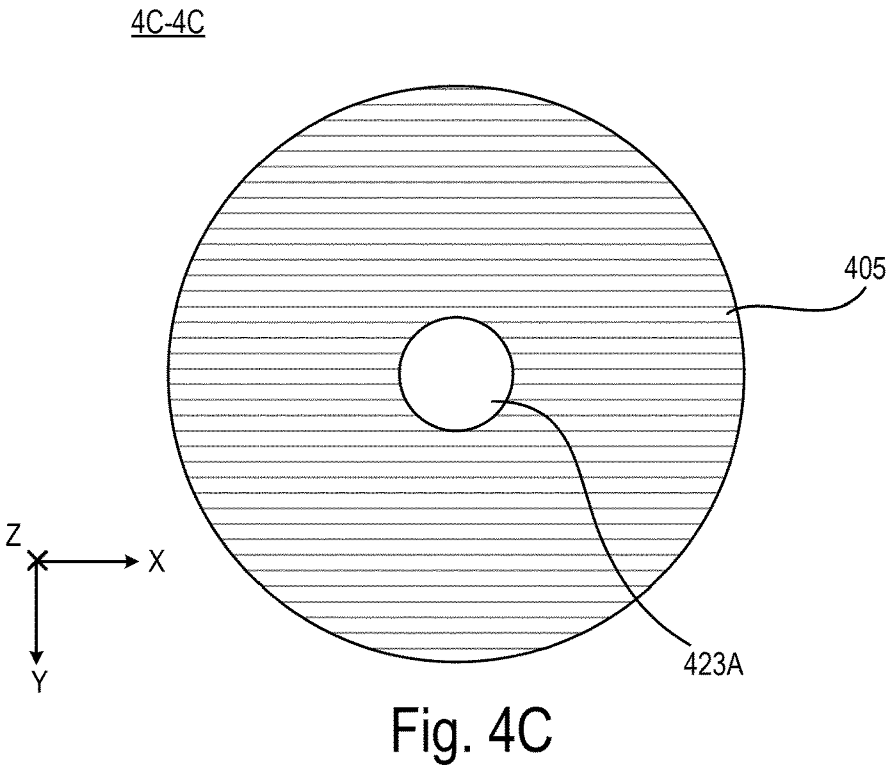
FIGS. 4C and 4D are axial cross sections taken along respective lines 4C-4C and 4D-4D of the freeze valve of FIG. 4B.
Figure 4D:
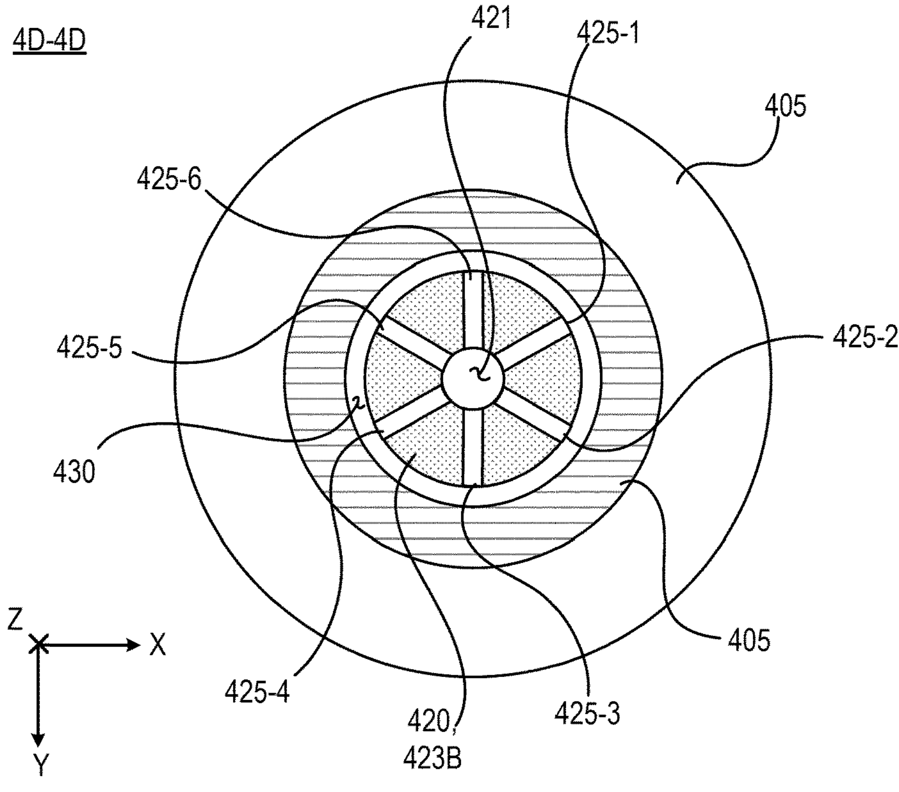

Referring to FIG. 2B, the freeze valve 100 is shown in the open state during which the fluid 208F can flow through the axial opening 121. The fluid 208F can be or can include a gas 209G such as a purge or forming gas that is pumped in from a gas system (such as shown in FIG. 3). Such a purge or forming gas can be a gas that is non-reactive with the target material and the materials of the valve body 120 and the valve sleeve 108. The purge or forming gas can include, for example, an inert gas such as argon and hydrogen. The fluid 208F can also include target material in liquid form that remains within the freeze valve 100. The fluid 208F can be conducted from the external gas system (FIG. 3), through the first fluid port 101A through the annular gap 130 (FIGS. 1A, 2A, and 2B) that is the portion of the axial bore 106 defined between the valve sleeve 105 and the valve body 120, through the through holes 125-*i* of the longitudinal section 123B, and then through the axial opening in the +Z direction. The conductance of the fluid 208F from the first fluid port 101A and through the axial opening 121 depends on the total cross-sectional area of all of the through holes 125-*i* and the total number of through holes 125-*i*. As an example, if the pressure applied to the purge or forming gas is in the molecular flow regime (that is, on the order of $10^{-6}$ PSI) and the freeze valve 100 is at room temperature, and if the diameter $D_{121}$ of the axial opening 121 is 2.5 mm, and there are 30 through holes 125-*i*, with a diameter $D_{125}$ of each through hole 125-*i* being 0.5 mm, then the conductance through the freeze valve 100 can be about $7\times10^{-5}$ liters/s (L/s). A comparably-sized freeze valve that lacks the through holes 125-*i* arranged in a valve body 120 within a valve sleeve 105 could have a conductance of about $3\times10^{-6}$ L/s under similar conditions.

Referring again to FIG. 1B, in the implementation shown, the valve body 120 (including the longitudinal section 123B) and the valve sleeve 105 have cylindrical shapes such that the axis of each of the cylinders aligns with each other and is also parallel with the Z axis. The valve body 120 and the valve sleeve 105 are rigid enough to withstand pressures applied to the freeze valve 100 (such as the pressure P applied to the solid target material 207S or the pressure of the gas 209G). The valve body 120 and the valve sleeve 105 are made of materials that are compatible with (and non-reactive with) the target material that comes in contact with the valve body 120 and the valve sleeve 105. For example, with reference to FIG. 3, if the freeze valve 100 is used in a target material nozzle assembly 340 that is configured to supply targets to an EUV light source (shown in FIG. 8), then the target material 342 can include tin or a tin alloy. For such an application, the valve body 120 and the valve sleeve 105 should be non-reactive with the tin of the target material 342. In such an application, the valve body 120 and the valve sleeve 105 can be made of a refractory metal such as molybdenum, tungsten, niobium, rhenium, or an alloy of these metals.

Referring to FIG. 3, an implementation 300 of the freeze valve 100 is used in the target material nozzle assembly 340. The target material nozzle assembly 340 includes a nozzle 344 in fluid communication with a reservoir 346. The reservoir 346 is configured to hold liquid target material 342. A fluid flow path 348 is formed between the reservoir 346 and the nozzle 344 to thereby supply liquid target material 342 stored in the reservoir 346 to the nozzle 344. The fluid flow path 348 can include components (such as additional valves and reservoirs) for additional control of the liquid target material 342. The nozzle 344 can be made of a capillary tube 347 extending generally along a longitudinal direction and defining an opening 345. The opening 345 is at an end of the capillary tube 347 and the opening 345. The capillary tube 347 can be made from, for example, glass in the form of fused silica, borosilicate, aluminosilicate, or quartz. The liquid target material 342 flows through the capillary tube 347 and is ejected through the opening 345. When the pressure applied at the reservoir 346 is greater than a certain pressure (such as the Laplace pressure), the liquid target material 342 exits the opening 345 as a stream of targets (as shown below in FIG. 7C).

The freeze valve 300 is a purging freeze valve that is in fluid communication with the fluid flow path 348 between the nozzle 344 and the reservoir 346. The freeze valve 300 is designed like the freeze valve 100 and includes a first fluid port 301A and a second fluid port 301B. The first fluid port 301A is in fluid communication with a gas system 311 while the second fluid port 301B is in fluid communication with the fluid flow path 348.

The freeze valve 300 also includes a temperature control apparatus 310 configured to control the temperature at which the freeze valve 300 operates to thereby open and close the freeze valve 300, as discussed below in more detail. For example, the temperature control apparatus 310 can be a cartridge heater in thermal communication with one or more of the valve body 320 and the valve sleeve 305 of the freeze valve 300. If the temperature control apparatus 310 maintains the temperature of the valve sleeve 305 and the valve body 320 substantially below the melting point of the liquid target material 342, then any liquid target material 342 within the axial opening 321 of the freeze valve 300 solidifies (changes state from a liquid to a solid), and this solid target material plugs the axial opening 321, thereby preventing any fluid (such as the liquid target material 342 or the gas from the gas system 311) from passing through the freeze valve 300. If the temperature control apparatus 310 maintains the temperature of the valve sleeve 305 and the valve body 320 above the melting point of the liquid target material 342, then any solid target material within the axial opening 321 (and also within the through holes 325) melts to form the liquid target material 342, and such liquid target material 342 (and the gas from the gas system 311) would then be free to flow through the freeze valve 300.

Referring to FIGS. 4A-4D, an implementation 400 of the freeze valve 100 is shown. Like the freeze valve 100, the freeze valve 400 includes a valve sleeve 405 and a valve body 420. The valve sleeve 405 defines an axial bore 406 that is in fluid communication with a first fluid port 401A. The valve body 420 defines an axial opening 421 between an axially-closed end 422A that is received within the axial bore 406 and an axially-open end 422B that is in fluid communication with a second fluid port 401B. Both the valve body 420 and the valve sleeve 405 are radially symmetric and therefore cylindrically shaped. The valve body 420 includes an axial stop 423A at the axially-closed end 422A and a longitudinal section 423B extending axially along the +Z direction from the axial stop 423A, the axial opening 421 within the longitudinal section 423B. A gap 430 is formed between the valve sleeve 405 and the axially-closed end 422A. The axial opening 421 extends along an axial direction that is parallel with the Z axis. The valve body 420 includes one or more through holes 425-*i* formed in the longitudinal section 423B of the axially-closed end 422A, where i is the set of numbers 1, 2, . . . , I and I is a positive integer. Each through hole 425-*i* extends along a hole axis that is in a plane that is nonparallel with the Z axis. In this implementation, each through hole 425-*i* has a hole axis that is in the XY plane, which is perpendicular to the Z axis. In this implementation, there are a total of 30 through holes (i is the set of numbers 1, 2, . . . , 30 and I is 30). Six radially extending holes are arranged at distinct angles relative to each other in each of five XY planes that slice the valve body 420.

A sealing element 404 is fixed between a radial flange 426 of the valve body 420 (for example around the longitudinal section 423B of the valve body 420) and an outer radial surface 428 of the valve sleeve 405. The sealing element 404 can be a gasket. The valve body 420 can include an outer connecting surface 413 and the valve sleeve 405 can include an inner connecting surface 414 that are arranged next to each other when the valve 400 is fully assembled. For example, the outer connecting surface 413 and the inner connecting surface 414 can include mating threads. During assembly of the freeze valve 400, the gasket 404 is positioned at the outer radial surface 428 of the valve sleeve 405; the valve body 420 (and specifically the axially-closed end 422A) is inserted into the axial bore 406 along the −Z direction; the valve body 420 is turned relative to the valve sleeve 405 when the inner connecting surface 414 makes contact with the outer connecting surface 413 to thereby screw the valve body 420 into the valve sleeve 405; and the valve body 420 is turned relative to the valve sleeve 405 while moving along the −Z direction until the gasket 404 is pressed and forms a seal that prevents any materials from leaving the gap 430 between the valve sleeve 405 and the valve body 420. In some implementations, the outer connecting surface 413 can be formed on a mating element 431 that is fixed to an exterior surface of the longitudinal section 423B.

Figure 5:
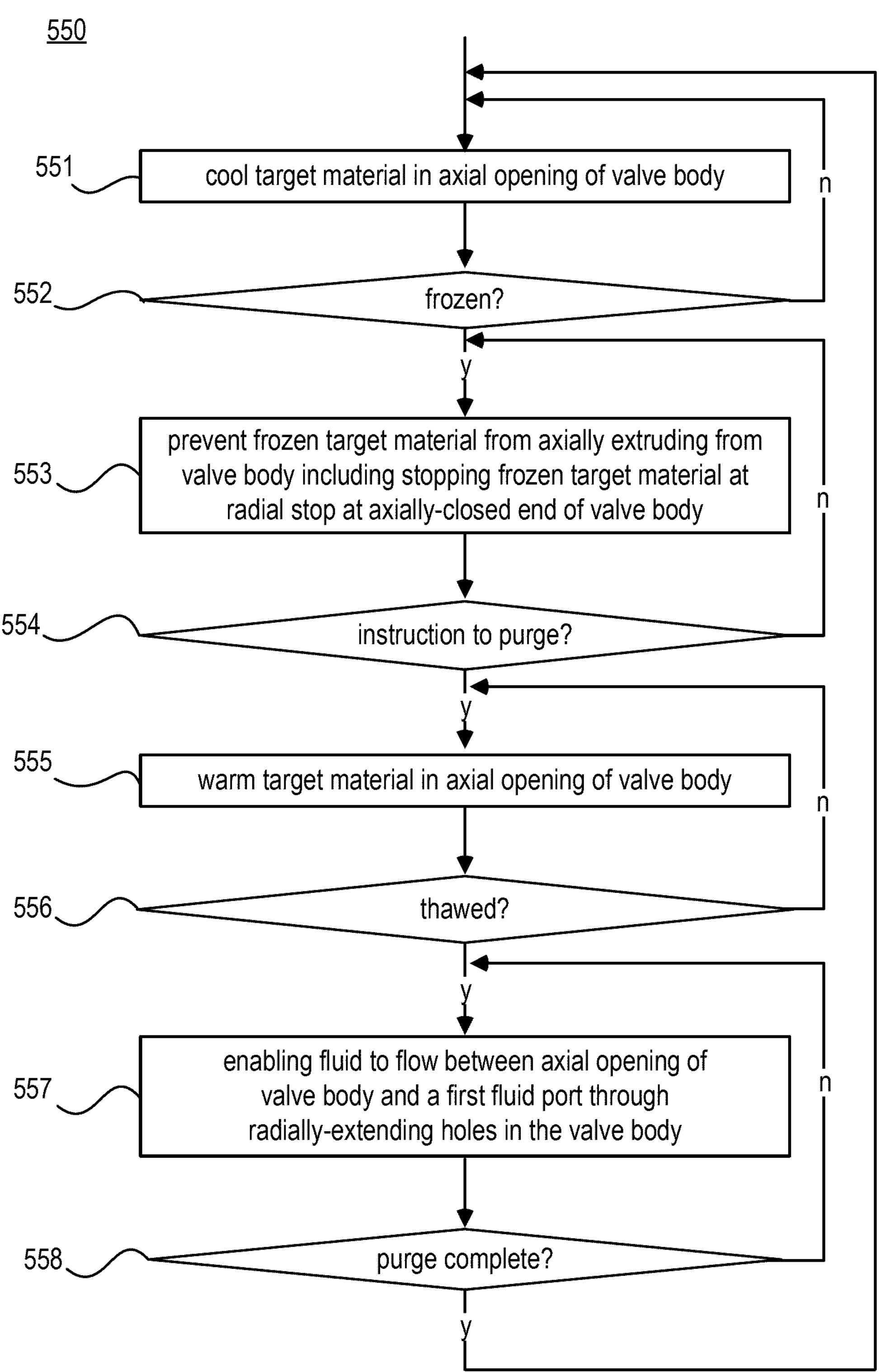
FIG. 5 is a flow chart showing a procedure for controlling fluid using any of the freeze valves of FIGS. 1A-4D.

Referring to FIG. 5, a procedure 550 is performed by a freeze valve 600 (which can be the freeze valve 100, 300, or 400) that is used in a target material nozzle assembly 740. The steps of the procedure 550 are shown with reference to the freeze valve 600 of FIGS. 6A-6E and the target material nozzle assembly 740 of 7A-7F. The features (such as the gap 630 and the through holes 625-*i*) of the freeze valve 600 are exaggerated and not to scale in order to show the operation. Moreover, only four through holes 625-*i* are shown, but as noted above, fewer than four or more than four may be formed in the body 620 of the freeze valve 600. As discussed above, the number of through holes 625-*i* impacts the conductance through the freeze valve 600. At various moments in the procedure 550, the target material is in a solid form, and is designated as solid target material 607S in FIGS. 6A-7F. At other moments in the procedure 550, the target material is in a fluid (such as liquid) form, and is designated as liquid target material 607L in FIGS. 6A-7F. The purging or forming gas is designated as gas 608G in FIGS. 6A-7F.

Figures 7A, 7B:
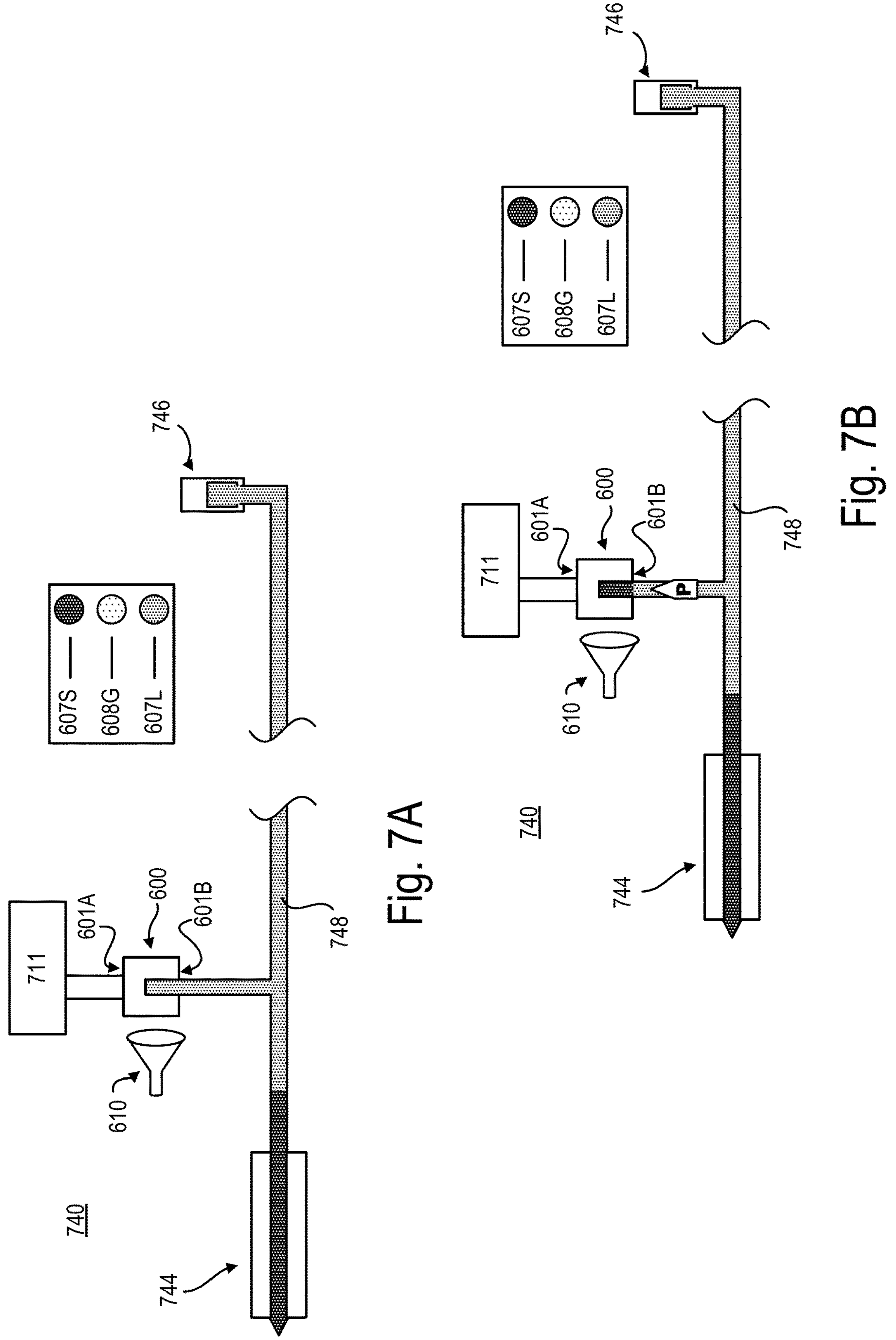
FIGS. 7A-7F are schematic diagrams showing the freeze valve of FIGS. 6A-6E in a target material nozzle assembly during the procedure of FIG. 5.

The procedure 550 begins by cooling target material that is present in the axial opening 621 of the valve body 620 (551). As shown in FIG. 7A, target material that is present in the axial opening 621 can include liquid target material 607L at the start of step 551. At the start of step 551, the liquid target material 607L has already entered the axial opening 621 thorough the second fluid port 601B, which is in fluid communication with a fluid flow path 748 formed between a reservoir 746 and a nozzle 744. It is additionally possible at this time for the gas system 711 to apply a pressure Pp along the +Z direction to prevent the liquid target material 607L within the axial opening 621 from leaking through the holes 625-*i*. At the start of step 551, the nozzle 744 is frozen, which means that the nozzle 744 is maintained at a temperature below the freezing point of the target material and thus only solid target material 607S is present in the nozzle 744 and the nozzle 744 is effectively closed. Thus, liquid target material 607L is not flowing to the nozzle 744.

In some implementations, or in order to speed up the cooling process, the liquid target material 607L can be actively cooled (551) by the temperature control apparatus 610. In other implementations in which the liquid target material 607L has a melting point higher than ambient temperatures (such as tin, which has a melting point of about 232° C.), the liquid target material 607L can be passively cooled (551) by simply removing a source of heat applied to the valve body 620 and the valve sleeve 605 (for example, by turning off the temperature control apparatus 610).

Figures 6A, 6B, 6C:
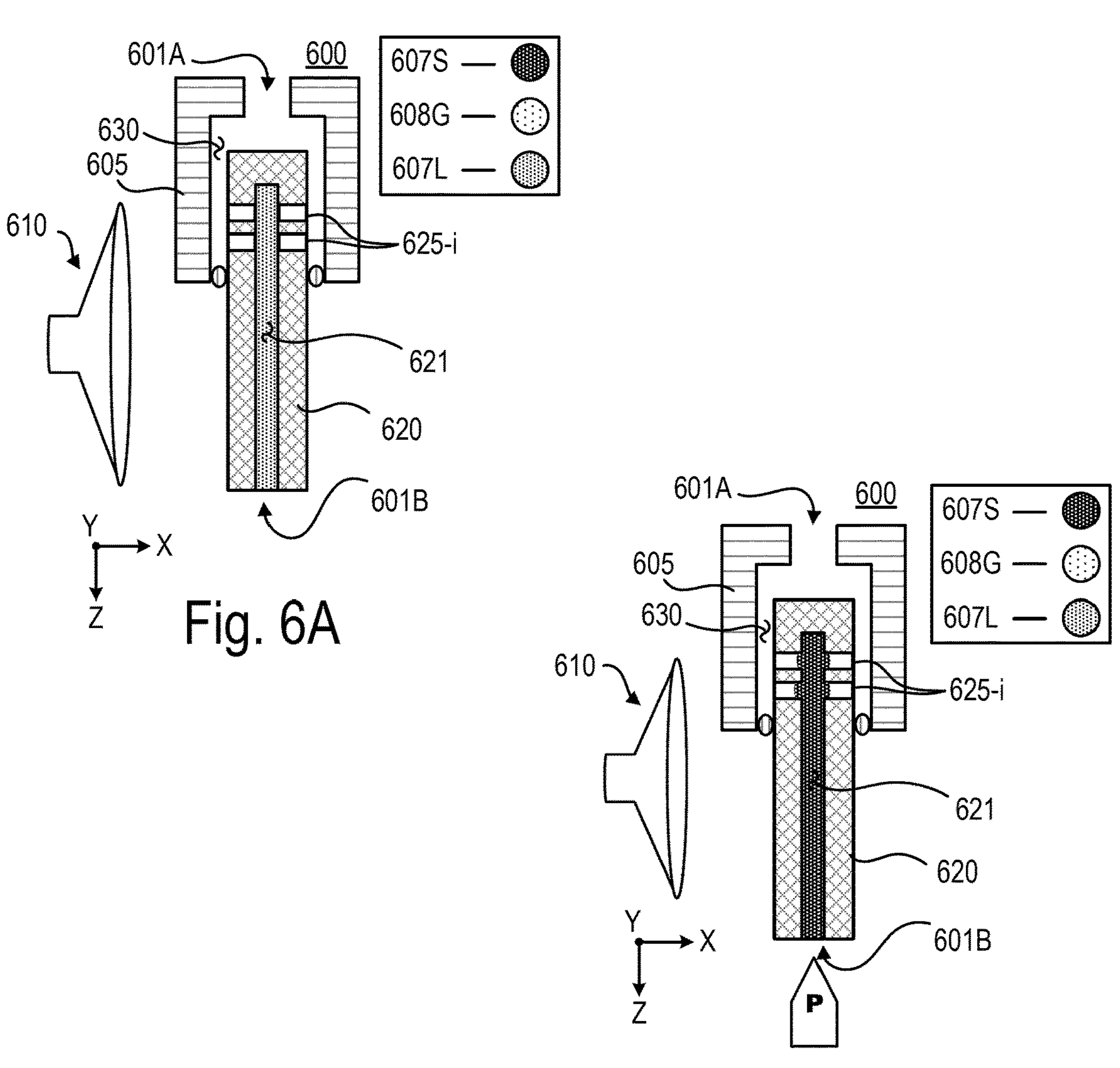
FIGS. 6A-6E are side cross-sectional views of the freeze valve of FIGS. 1A-1C at various steps during the procedure of FIG. 5.

Once the liquid target material 607L within the axial opening 621 of the freeze valve 600 is fully frozen (552), then the freeze valve 600 can operate in the closed state, which is shown in FIGS. 6B and 7B. In the closed state, the freeze valve 600 holds or maintains the solid target material 607S. Specifically, due to the design of the freeze valve 600, the solid target material 607S is prevented from axially extruding from the valve body 620 even at pressures P applied along the −Z direction (FIG. 6B) through the second fluid port 601B, such pressure P being as high as 31,000 PSI (553). In particular, the solid target material 607S is prevented from moving axially along the-Z direction (FIG. 6B) and through the first fluid port 601A because the solid target material 607S is stopped by the axial stop 123A (FIG. 1A) of the valve body 620. Moreover, the solid target material 607S faces greater friction when it attempts to extrude through the through holes 625, which, as discussed above, extend along a direction that is not parallel with (for example, can be orthogonal to) the direction at which the pressure P is applied. Thus, even if some solid target material 607S enters a through hole 625-*i*, it does not advance very far and does not reach the gap 630 as long as the pressure P remains below the punch pressure (which, as discussed above, the punch pressure is as high as 31,000 PSI).

Figures 7C, 7D:
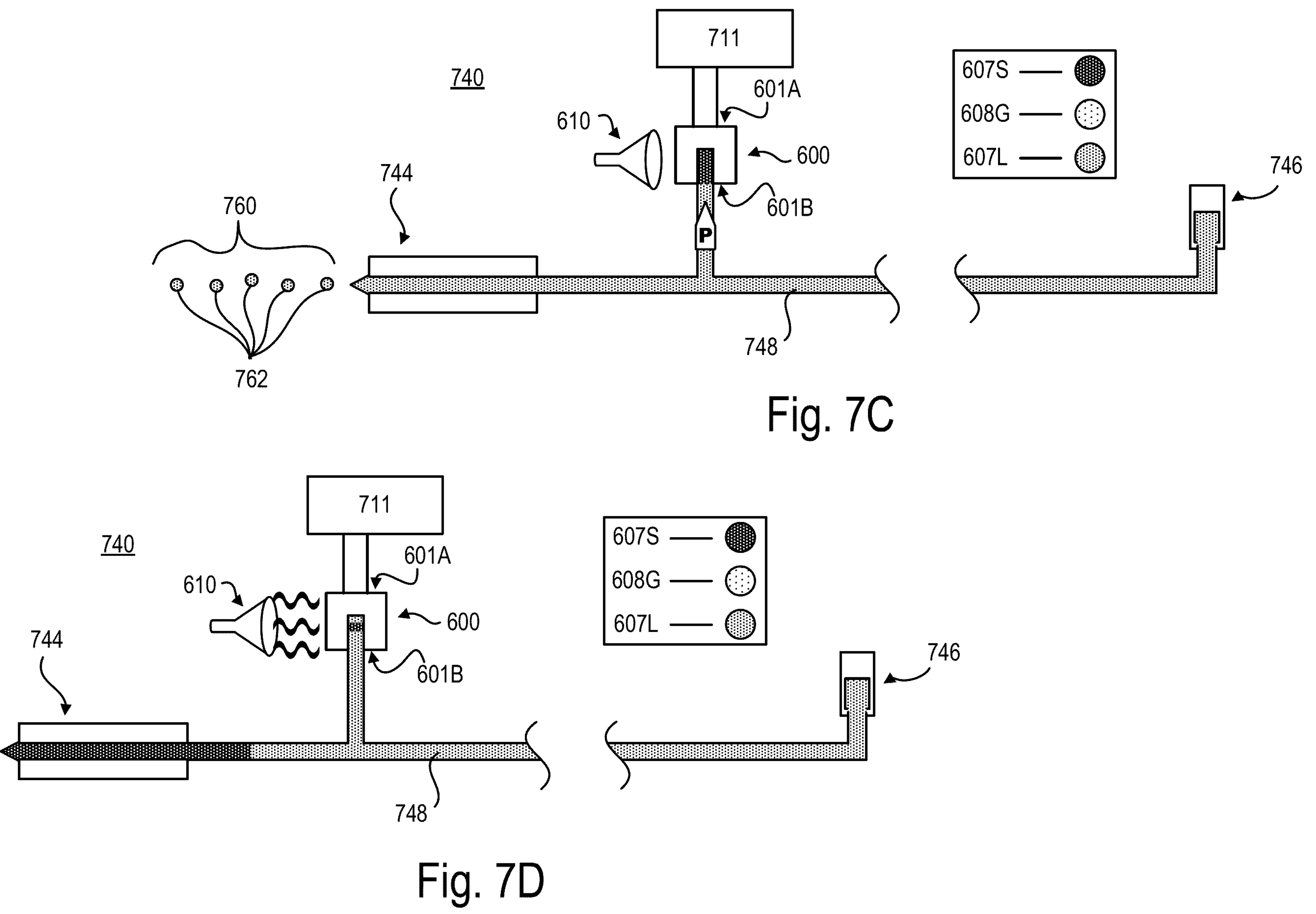

At this moment in the procedure 550, and with reference to FIG. 7C, because the freeze valve 600 is closed, the target material nozzle assembly 740 can operate in supply mode, in which time the nozzle 744 is unfrozen (such that the solid target material 607S that was in the nozzle 744 thaws, and the liquid target material 607L (that is stored within the reservoir 746) can be supplied to the nozzle 744. Due to the geometry of the nozzle, 744, the liquid target material 607L exits through the nozzle 744 as a stream 760 of targets 762 when the pressure P is increased to a value that is greater than a pre-determined minimum nozzle pressure. For example, the pre-determined minimum nozzle pressure can be about 100 PSI.

When the nozzle 744 needs to be serviced or replaced, an instruction to purge is received (554). At this point, the gas system 711, the freeze valve 600, and the nozzle 744 work together to clear any liquid target material 607L from the fluid flow path 748 between the nozzle 744 and the reservoir 746. In order to do this, the nozzle 744 is frozen (as discussed above), and then the freeze valve 600 needs to go from being closed (as shown in FIG. 6B) to being open. The temperature control apparatus 610 begins to actively warm the solid target material 607S within the freeze valve 600 (555). FIGS. 6C and 7D show this active warming while some of the solid target material 607S has melted into liquid target material 607L. During this time, the pressure P applied to the liquid target material 607L is reduced and liquid target material 607L is no longer being actively supplied to the nozzle 744 since the nozzle 744 is frozen. Accordingly, the nozzle 744 stops producing the stream 760 of targets 762. Nevertheless, some liquid target material 607L may remain in the fluid flow path 748 between the nozzle 744 and the reservoir 746.

Figure 6D:
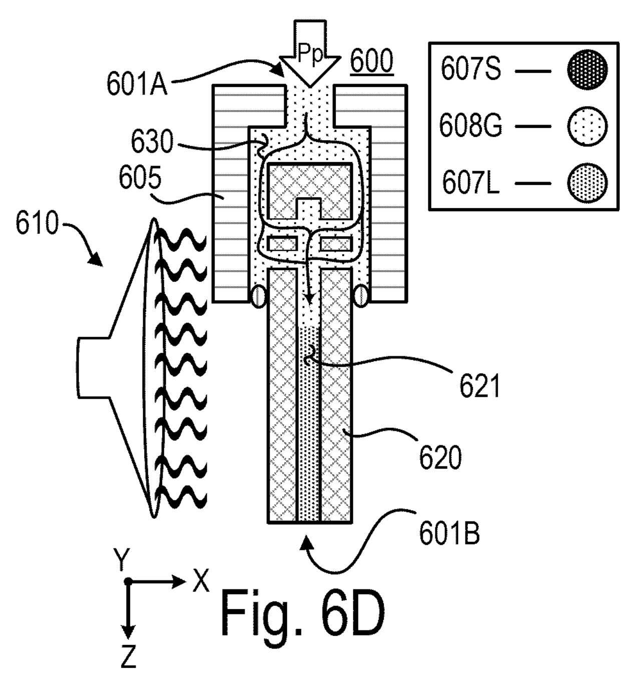

Once all of the solid target material 607S has thawed (556), then fluid is enabled to flow between the axial opening 621 of the valve body 620 and the first fluid port 601A through the radially extending holes 625-*i* in the valve body 620 (557). Because a purge is being performed, the gas system 711 supplies a purge or forming gas 608G (under a pressure Pp) along the +Z direction (FIG. 6D) through the first fluid port 601A of the freeze valve 600. In the beginning, the gas 608G enters the first fluid port 601A and the gap 630, and then it enters the through holes 625-*i*, as shown in FIG. 6D in detail and in general in FIG. 7E. The gas 608G pushes the liquid target material 607L out of the freeze valve 600, and also out of the fluid flow path 748. The gas 608G is pushed through the freeze valve 600 at a conductance rate, and the conductance increases with the number of through holes 625-*i* in the valve body 620. Eventually, all of the liquid target material 607L that was within the freeze valve 600 and in the fluid flow path 748 is pushed back into the reservoir 746 by the gas 608G. And, this moment can happen more quickly with a higher conductance of the gas 608G through the freeze valve 600.

Figure 6E:
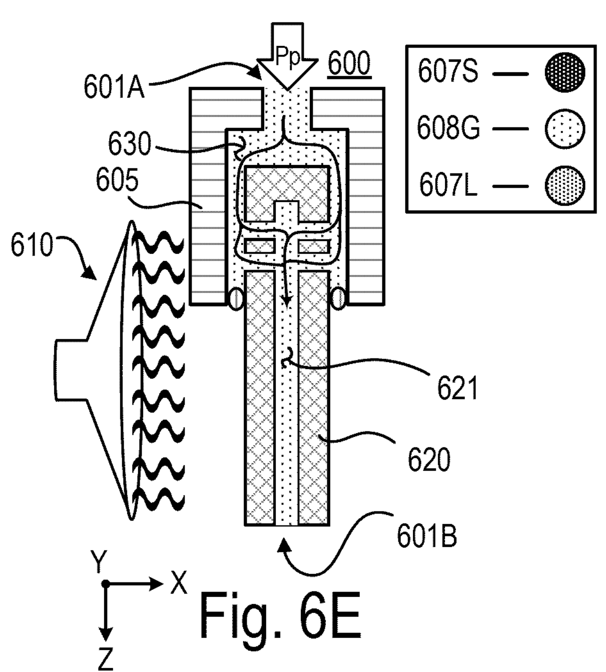
Figures 7E, 7F:
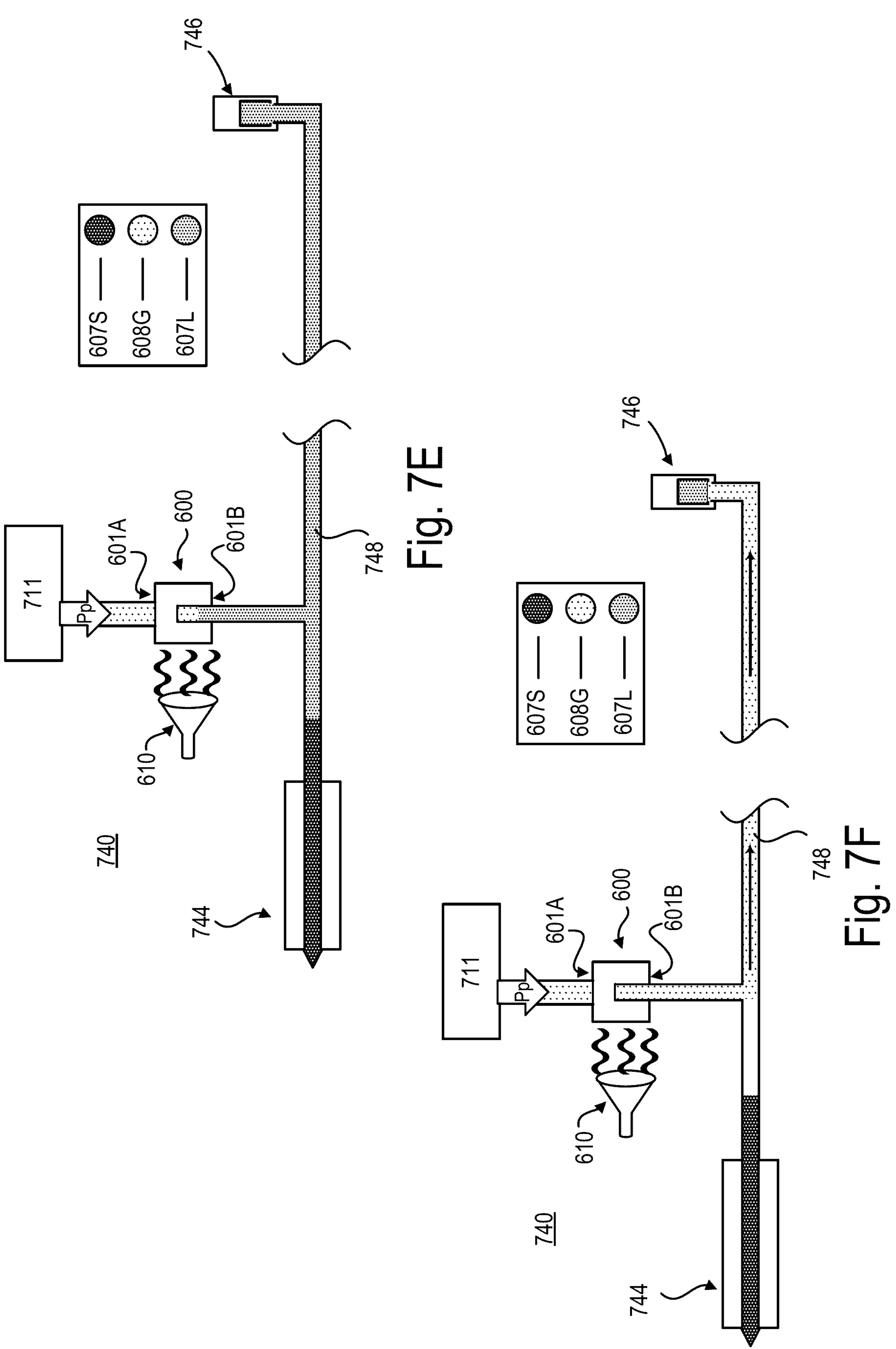

FIGS. 6E and 7F show the state of the freeze valve 600 and the target material nozzle assembly 740 when the purge is complete (558). At this time, the nozzle 744 can be serviced or removed since the purge is complete (558).

The procedure 550 can further include the additional step of determining whether the nozzle 744 service or replacement is complete and an instruction to operate the nozzle 744 under normal operating conditions is received. At this time, the liquid target material 607L can be re-supplied into the fluid flow path 748 and also the valve body 620 of the freeze valve 600 from the reservoir 746, as shown in FIGS. 6A and 7A.

Figure 8:
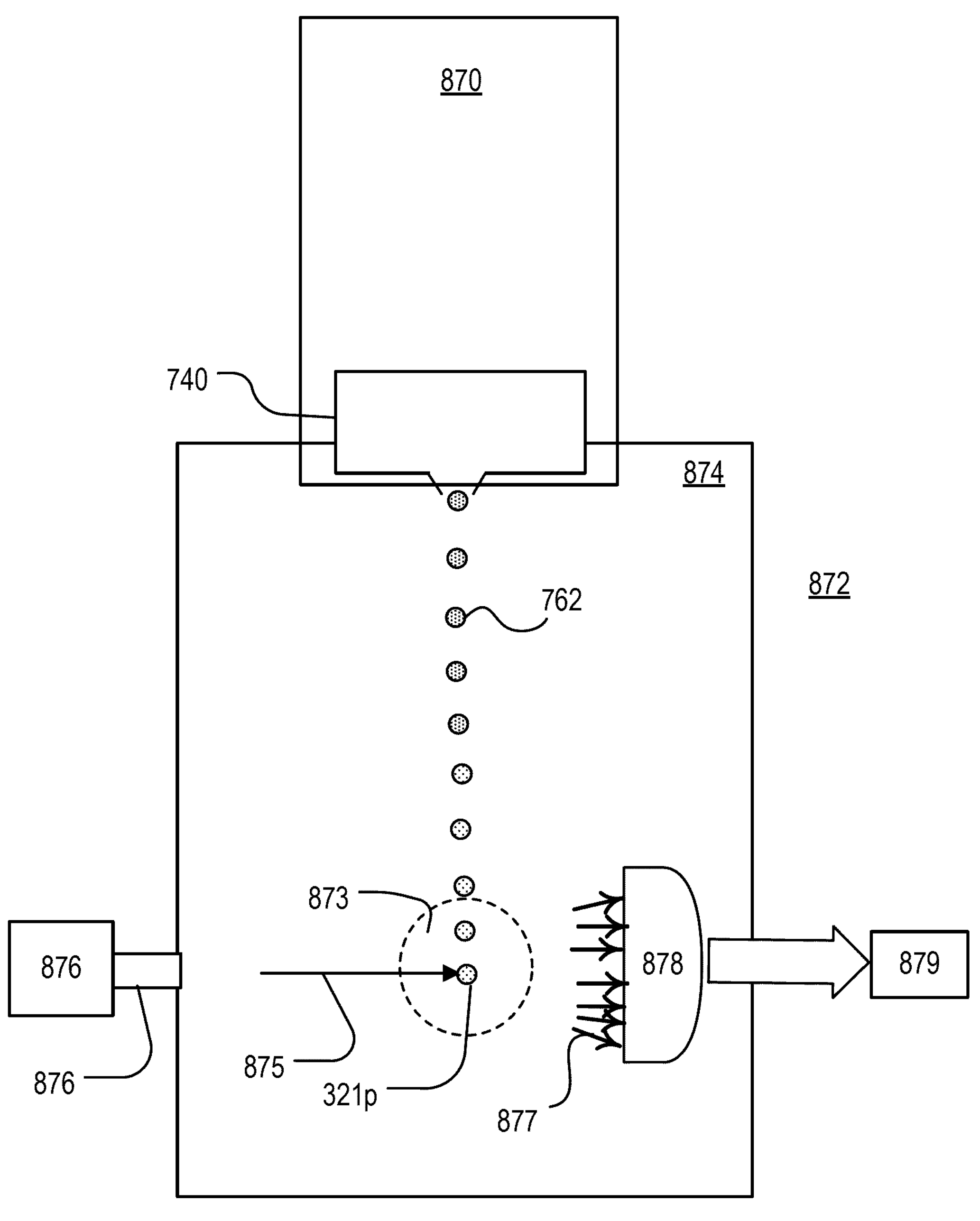
FIG. 8 is a schematic block diagram showing an implementation of the target material nozzle assembly of FIG. 3 integrated within a target generator that supplies targets to an EUV light source.

Referring to FIG. 8, the target material nozzle assembly 740 can be integrated within a target generator 870 that includes additional fluid flow paths and additional reservoirs, in addition to other fluid regulation devices (or valves). The target generator 870 can also include a priming system that is configured to receive a solid matter that includes target material. An example of such a target generator 870 is shown in WO 2020/187617, which is incorporated herein by reference in its entirety.

The target generator 870 supplies the liquid target material 607L in the form of the stream 760 of targets 762 to an external system 872. If the system 872 is an EUV light source, then each target 762 is delivered to a plasma formation location 873 in a vacuum chamber 874. The plasma formation location 873 can receive at least one light beam 875 (which can be a pulsed light beam) that has been generated by an optical source 875 and delivered to the vacuum chamber 874 via an optical path 876. An interaction between a pulse of the light beam 875 and the target material in the target 762 within the plasma formation location 873 produces a plasma that emits EUV light 877, which is collected 878 and supplied to a lithography exposure apparatus 879. In this example, the liquid target material 607L can be any material that emits EUV light 877 when in a plasma state. For example, the liquid target material 607L can include water, tin, lithium, and/or xenon.

Other implementations are within the scope of the following claims. For example, if the fluid target material 607L is water or includes water, then the valve body 620 and the valve sleeve 605 can be made of a material such as a refractory metal (as discussed above), or a material such as stainless steel, plastic, or even wood. The choice of material to select for the valve body 620 and the valve sleeve 605 depends also on the operating pressures applied to the freeze valve 600 as well as manufacturing cost and methods.

The implementations can be further described using the following clauses.

1. A freeze valve comprising:
   a valve body including a longitudinal section defining an axial opening through which fluid flows; wherein the valve body defines a plurality of holes, each hole extending from and in fluid communication with the axial opening and through the longitudinal section of the valve body, and each hole having a diameter that is smaller than a diameter of the axial opening.
2. The freeze valve of clause 1, wherein the longitudinal section of the valve body has a cylindrical shape.
3. The freeze valve of clause 1, wherein each hole extends radially from the axial opening to an exterior of the valve body.
4. The freeze valve of clause 1, wherein the valve body includes an axial stop at an end of the longitudinal section, the axial stop being configured to retain solid target material at temperatures below the freezing point of the target material upon application of pressure, and the holes provide a flow path that enables gas flow therethrough at temperatures above the freezing point of the target material.
5. The freeze valve of clause 4, wherein the holes provide fluid communication between the axial opening of the valve body and a first fluid port of the freeze valve.
6. The freeze valve of clause 4, wherein the axial stop is configured to retain the solid target material at temperatures below the freezing point of the target material and at pressures greater than 30,000 pounds per square inch (PSI).
7. The freeze valve of clause 4, wherein the holes are configured to enable the gas to flow between the axial opening and the first fluid port at a conductance of at least $10^{-5}$ liters/second (L/s) at room temperature and in the molecular flow regime.
8. The freeze valve of clause 4, wherein the target material includes tin and the gas includes an inert gas and hydrogen.
9. The freeze valve of clause 1, wherein the valve body comprises a refractory metal.
10. The freeze valve of clause 1, wherein the valve body comprises molybdenum, tungsten, niobium, rhenium, or an alloy of any of these materials.
11. The freeze valve of clause 1, further comprising a valve sleeve axially aligned with the valve body, the valve body being received within an axial bore of the valve sleeve.
12. The freeze valve of clause 11, wherein a fluid flow gap is defined between the valve sleeve and the valve body such that a fluid flow path is formed between the holes of the valve body and the axial bore of the valve sleeve.
13. The freeze valve of clause 1, wherein each of the holes extends perpendicularly to the axial direction of the axial opening.
14. A freeze valve comprising:
   a valve sleeve defining an axial bore that is in fluid communication with a first fluid port; and
   a valve body defining an axial opening between an axially-closed end that is received within the axial bore and an axially-open end that is in fluid communication with a second fluid port, wherein the valve body includes one or more through holes formed in a longitudinal section at the axially-closed end, each through hole fluidly coupling the axial opening and the axial bore of the valve sleeve.

15. The freeze valve of clause 14, wherein each of the one or more through holes has a diameter that is smaller than a diameter of the axial opening.

16. The freeze valve of clause 14, wherein the longitudinal section of the valve body has a cylindrical shape.

17. The freeze valve of clause 14, wherein the axially-closed end includes an axial stop at an end of the longitudinal section, the axial stop being configured to retain solid target material at temperatures below the freezing point of the target material upon application of pressure, and the holes provide a flow path that enables gas flow therethrough at temperatures above the freezing point of the target material.

18. The freeze valve of clause 17, wherein the holes provide fluid communication between the axial opening of the valve body and the first fluid port.

19. The freeze valve of clause 17, wherein the holes provide the flow path for gas to flow through the holes at a conductance of at least $10^{-5}$ liters/second (L/s) at room temperature and in the molecular flow regime.

20. The freeze valve of clause 17, wherein the target material includes tin and the gas includes an inert gas and hydrogen.

21. The freeze valve of clause 14, wherein the axially-closed end includes an axial stop at an end of the longitudinal section, the axial stop being configured to retain the solid target material at temperatures below the freezing point of the target material and at pressures greater than 30,000 pounds per square inch (PSI).

22. The freeze valve of clause 14, wherein the valve body and the valve sleeve comprise a refractory metal.

23. The freeze valve of clause 14, wherein the valve body and the valve sleeve comprise molybdenum, tungsten, niobium, rhenium, or an alloy of any of these materials.

24. The freeze valve of clause 14, wherein the valve sleeve and the valve body are axially aligned.

25. The freeze valve of clause 24, wherein a fluid flow gap is defined between the valve sleeve and the valve body such that a fluid flow path is formed between the holes of the valve body and the axial bore of the valve sleeve.

26. The freeze valve of clause 14, wherein the first fluid port and the second fluid port are axially aligned with the valve body.

27. The freeze valve of clause 14, wherein each hole extends radially from the axial opening to the axial bore at an exterior of the longitudinal section of the valve body.

28. The freeze valve of clause 14, wherein each of the holes extends perpendicularly to the axial direction of the axial opening.

29. A method of controlling fluid comprising:
cooling a target material within an axial opening of a valve body;
once the target material is frozen, preventing the frozen target material from axially extruding from the valve body when an axial pressure greater than 10,000 PSI is applied to the frozen target material including stopping the frozen target material at an axial stop formed at an axially-closed end of the valve body;
thawing the target material within the axial opening of the valve body; and
once the target material is thawed, enabling a fluid to flow between the axial opening of the valve body and a first fluid port through holes formed in a longitudinal section of the valve body at the axially-closed end.

30. The method of clause 29, wherein enabling the fluid to flow between the axial opening of the valve body and the first fluid port through the holes formed in the longitudinal section comprises supplying pressurized gas through the first fluid port and into the axial opening by way of the holes.

31. The method of clause 30, wherein the pressurized gas pushes thawed target material out of the axial opening of the valve body.

32. The method of clause 29, wherein preventing the frozen target material from axially flowing out of the valve body comprises preventing the frozen target material from axially extruding from the valve body when the axial pressure greater than 30,000 PSI is applied to the frozen target material including stopping the frozen target material at the axial stop.

33. The method of clause 29, wherein enabling the fluid to flow between the axial opening of the valve body and the first fluid port through the holes comprises enabling fluid to flow at a conductance that is greater than at least $10^{-5}$ liters/second (L/s) at room temperature and in the molecular flow regime.

34. A target material nozzle assembly comprising:
a nozzle in fluid communication with a reservoir; and
a purging freeze valve in fluid communication with a fluid flow path between the nozzle and the reservoir, the purging freeze valve comprising:
a valve sleeve defining an axial bore that is in fluid communication with a first fluid port; and
a valve body defining an axial opening between an axially-closed end that is received within the axial bore and an axially-open end that is in fluid communication with a second fluid port that is in fluid communication with the fluid flow path between the nozzle and the reservoir, wherein the valve body includes one or more through holes formed in a longitudinal section of the valve body at the axially-closed end, each through hole fluidly coupling the axial opening and the first fluid port.

Still other implementations are within the scope of the following claims.

The invention claimed is:

1. A freeze valve comprising:
a valve sleeve defining an axial bore that is in fluid communication with a first fluid port; and
a valve body defining an axial opening between an axially-closed end that is received within the axial bore and an axially-open end that is in fluid communication with a second fluid port, wherein the valve body includes one or more through holes formed in a longitudinal section at the axially-closed end, each through hole fluidly coupling the axial opening and the axial bore of the valve sleeve.

2. The freeze valve of claim 1, wherein each of the one or more through holes has a diameter that is smaller than a diameter of the axial opening.

3. The freeze valve of claim 1, wherein the axially-closed end includes an axial stop at an end of the longitudinal section, the axial stop being configured to retain a solid target material at temperatures below the freezing point of the target material upon application of pressure, and the holes provide a flow path that enables gas flow therethrough at temperatures above the freezing point of the target material.

4. The freeze valve of claim 3, wherein the holes provide fluid communication between the axial opening of the valve body and the first fluid port.

5. The freeze valve of claim 3, wherein the holes provide the flow path for gas to flow through the holes at a conductance of at least $10^{-5}$ liters/second (L/s) at room temperature and in the molecular flow regime.

6. The freeze valve of claim 3, wherein the target material includes tin and the gas includes an inert gas and hydrogen.

7. The freeze valve of claim 1, wherein the axially-closed end includes an axial stop at an end of the longitudinal section, the axial stop being configured to retain a solid target material at temperatures below the freezing point of the target material and at pressures greater than 30,000 pounds per square inch (PSI).

8. The freeze valve of claim 1, wherein the valve body and the valve sleeve comprise a refractory metal.

9. The freeze valve of claim 1, wherein the valve body and the valve sleeve comprise molybdenum, tungsten, niobium, rhenium, or an alloy of any of these materials.

10. The freeze valve of claim 1, wherein the valve sleeve and the valve body are axially aligned.

11. The freeze valve of claim 1, wherein the valve sleeve and the valve body are axially aligned, and wherein a fluid flow gap is defined between the valve sleeve and the valve body such that a fluid flow path is formed between the holes of the valve body and the axial bore of the valve sleeve.

12. The freeze valve of claim 1, wherein the first fluid port and the second fluid port are axially aligned with the valve body.

13. The freeze valve of claim 1, wherein each hole extends radially from the axial opening to the axial bore at an exterior of the longitudinal section of the valve body.

14. The freeze valve of claim 1, wherein each of the holes extends perpendicularly to the axial direction of the axial opening.

15. A method of controlling fluid comprising:

cooling a target material within an axial opening of a valve body;

once the target material is frozen, preventing the frozen target material from axially extruding from the valve body when an axial pressure greater than 10,000 PSI is applied to the frozen target material including stopping the frozen target material at an axial stop formed at an axially-closed end of the valve body;

thawing the target material within the axial opening of the valve body; and once the target material is thawed, enabling the fluid to flow between the axial opening of the valve body and a first fluid port through holes formed in a longitudinal section of the valve body at the axially-closed end.

16. The method of claim 15, wherein enabling the fluid to flow between the axial opening of the valve body and the first fluid port through the holes formed in the longitudinal section comprises supplying pressurized gas through the first fluid port and into the axial opening by way of the holes.

17. The method of claim 16, wherein the pressurized gas pushes thawed target material out of the axial opening of the valve body.

18. The method of claim 15, wherein preventing the frozen target material from axially flowing out of the valve body comprises preventing the frozen target material from axially extruding from the valve body when the axial pressure greater than 30,000 PSI is applied to the frozen target material including stopping the frozen target material at the axial stop.

19. The method of claim 15, wherein enabling the fluid to flow between the axial opening of the valve body and the first fluid port through the holes comprises enabling fluid to flow at a conductance that is greater than at least $10^{-5}$ liters/second (L/s) at room temperature and in the molecular flow regime.

20. A target material nozzle assembly comprising:

a nozzle in fluid communication with a reservoir; and a purging freeze valve in fluid communication with a fluid flow path between the nozzle and the reservoir, the purging freeze valve comprising:

a valve sleeve defining an axial bore that is in fluid communication with a first fluid port; and a valve body defining an axial opening between an axially-closed end that is received within the axial bore and an axially-open end that is in fluid communication with a second fluid port that is in fluid communication with the fluid flow path between the nozzle and the reservoir, wherein the valve body includes one or more through holes formed in a longitudinal section of the valve body at the axially-closed end, each through hole fluidly coupling the axial opening and the first fluid port.

* * * * *